United States Patent
Pande

(10) Patent No.: US 11,494,736 B2
(45) Date of Patent: *Nov. 8, 2022

(54) INTERNET-BASED METHOD AND APPARATUS FOR CAREER AND PROFESSIONAL DEVELOPMENT VIA STRUCTURED FEEDBACK LOOP

(71) Applicant: Vmock Inc., Palo Alto, CA (US)

(72) Inventor: Salil Pande, Palo Alto, CA (US)

(73) Assignee: Vmock Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/366,253

(22) Filed: Jul. 2, 2021

(65) Prior Publication Data

US 2021/0406835 A1 Dec. 30, 2021

Related U.S. Application Data

(60) Continuation of application No. 16/410,424, filed on May 13, 2019, now Pat. No. 11,055,667, which is a
(Continued)

(51) Int. Cl.
*G06Q 10/00* (2012.01)
*G06Q 10/10* (2012.01)
*G06Q 30/02* (2012.01)

(52) U.S. Cl.
CPC .......... *G06Q 10/105* (2013.01); *G06Q 10/10* (2013.01); *G06Q 10/1053* (2013.01); *G06Q 30/02* (2013.01)

(58) Field of Classification Search
CPC .......... G06Q 10/1053; G06Q 10/0639; G06Q 10/063; G06Q 10/105; G06Q 10/10; G06Q 30/02
See application file for complete search history.

(56) References Cited

U.S. PATENT DOCUMENTS

| 5,211,564 A | 5/1993 | Martinez et al. |
| 6,584,464 B1 | 6/2003 | Warthen |

(Continued)

FOREIGN PATENT DOCUMENTS

| JP | 2002215016 | 7/2002 |
| JP | 2002288328 | 10/2002 |

(Continued)

OTHER PUBLICATIONS

English translation of Japanese Office Action, for JP2016-574522, dated Feb. 27, 2019, pp. 1-11.
(Continued)

*Primary Examiner* — William S Brockington, III
(74) *Attorney, Agent, or Firm* — McDonnell Boehnen Hulbert & Berghoff LLP

(57) ABSTRACT

Methods and apparatus for generating feedback, reviewing feedback, and conducting interviews by use of VMocks are provided. A VMock, or Virtual Mock, is a virtual profile of a candidate that includes resume, text, video and a document. VMock profiles may be created that have one or more VMocks. Contacts associated with the VMock profile may be managed. Feedback may be requested from the contacts concerning the one or more VMocks, who may then generate the requested feedback. The feedback may then be reviewed. This feedback process may be performed in the context of interviews for employment opportunities and in other similar situations.

20 Claims, 20 Drawing Sheets

Related U.S. Application Data division of application No. 12/486,595, filed on Jun. 17, 2009, now Pat. No. 10,346,803.

(60) Provisional application No. 61/155,803, filed on Feb. 26, 2009, provisional application No. 61/073,245, filed on Jun. 17, 2008.

(56) References Cited

U.S. PATENT DOCUMENTS

| | | |
|---|---|---|
| 6,618,734 B1 | 9/2003 | Williams et al. |
| 6,662,194 B1 | 12/2003 | Joao |
| 6,743,024 B1 | 6/2004 | Ivler et al. |
| 7,076,456 B1 | 7/2006 | Rofrano |
| 7,711,573 B1 | 5/2010 | Obeid |
| 8,244,551 B1 | 8/2012 | Mund |
| 8,266,068 B1 | 9/2012 | Foss et al. |
| 8,352,406 B2 | 1/2013 | Costa |
| 8,500,450 B1 | 8/2013 | Taylor et al. |
| 10,346,803 B2 | 7/2019 | Pande |
| 2002/0029159 A1 | 3/2002 | Longden |
| 2002/0055870 A1 | 5/2002 | Thomas |
| 2002/0069083 A1 | 6/2002 | Harter et al. |
| 2002/0128894 A1 | 9/2002 | Farenden |
| 2003/0044760 A1 | 3/2003 | Banerjee et al. |
| 2003/0061231 A1 | 3/2003 | Lovegren |
| 2003/0071852 A1 | 4/2003 | Stimac |
| 2003/0129574 A1 | 7/2003 | Ferriol et al. |
| 2003/0227487 A1 | 12/2003 | Hugh |
| 2004/0008589 A1 | 1/2004 | McMillan et al. |
| 2004/0029092 A1 | 2/2004 | Orr et al. |
| 2004/0093263 A1 | 5/2004 | Doraisamy et al. |
| 2004/0177030 A1 | 9/2004 | Shoham |
| 2004/0186743 A1 | 9/2004 | Cordero, Jr. |
| 2004/0198495 A1 | 10/2004 | Cisneros et al. |
| 2005/0033633 A1 | 2/2005 | Lapasta et al. |
| 2005/0055231 A1 | 3/2005 | Lee |
| 2005/0080656 A1 | 4/2005 | Crow et al. |
| 2005/0209709 A1 | 9/2005 | Bradshaw |
| 2006/0073463 A1 | 4/2006 | Bajer et al. |
| 2006/0084046 A1 | 4/2006 | Brown et al. |
| 2006/0085373 A1 | 4/2006 | Dhillion et al. |
| 2006/0177808 A1 | 8/2006 | Aosawa et al. |
| 2006/0224404 A1 | 10/2006 | Keusseyan |
| 2006/0229902 A1 | 10/2006 | McGovern et al. |
| 2006/0265269 A1 | 11/2006 | Hyder et al. |
| 2007/0088601 A1 | 4/2007 | Money et al. |
| 2007/0160963 A1 | 7/2007 | Diaz et al. |
| 2007/0160964 A1 | 7/2007 | Albertsson |
| 2007/0203776 A1 | 8/2007 | Austin et al. |
| 2007/0214032 A1 | 9/2007 | Sci |
| 2008/0010219 A1 | 1/2008 | Hargroder |
| 2008/0016054 A1 | 1/2008 | Liska |
| 2008/0027747 A1 | 1/2008 | McGovern et al. |
| 2008/0086504 A1 | 4/2008 | Sanders et al. |
| 2008/0133343 A1 | 6/2008 | Hyder et al. |
| 2008/0195464 A1 | 8/2008 | Brooks |
| 2008/0206725 A1 | 8/2008 | Diaz et al. |
| 2008/0281620 A1 | 11/2008 | Schalk et al. |
| 2008/0300966 A1 | 12/2008 | Gocha, Jr. |
| 2009/0319289 A1 | 12/2009 | Pande |
| 2010/0070492 A1 | 3/2010 | Dattatri et al. |
| 2011/0039249 A1 | 2/2011 | Packard et al. |
| 2011/0055098 A1 | 3/2011 | Stewart |
| 2011/0136085 A1 | 6/2011 | Leroy |
| 2011/0246571 A1 | 10/2011 | Klier et al. |
| 2012/0197835 A1 | 8/2012 | Costa et al. |
| 2012/0221477 A1 | 8/2012 | Pande |
| 2012/0271774 A1 | 10/2012 | Clegg |
| 2013/0031015 A1 | 1/2013 | Schneider |
| 2013/0096991 A1 | 4/2013 | Gardner et al. |
| 2013/0198098 A1 | 8/2013 | Schneiderman et al. |
| 2013/0290208 A1 | 10/2013 | Bonmassar et al. |
| 2014/0019854 A1 | 1/2014 | Alexander et al. |
| 2014/0046862 A1 | 2/2014 | Weingarten et al. |
| 2014/0207770 A1 | 7/2014 | Madsen |
| 2014/0214710 A1 | 7/2014 | Dubnar et al. |
| 2014/0279635 A1 | 9/2014 | Bramlett et al. |
| 2015/0111192 A1 | 4/2015 | Mihai et al. |
| 2015/0248648 A1 | 9/2015 | Rao |
| 2016/0379170 A1 | 12/2016 | Pande |

FOREIGN PATENT DOCUMENTS

| | | |
|---|---|---|
| JP | 2002366790 | 12/2002 |
| JP | 2002373268 | 12/2002 |
| JP | 2003196433 | 7/2003 |
| JP | 2005190174 | 7/2005 |
| JP | 2009301569 | 12/2009 |
| JP | 2010061183 | 3/2010 |
| JP | 2010231685 | 10/2010 |
| WO | 2001/88781 | 11/2001 |
| WO | 2005/010789 | 2/2005 |
| WO | 2011/031456 | 3/2011 |
| WO | 2015/136555 | 9/2015 |

OTHER PUBLICATIONS

European Patent Office, Examination Report dated Feb. 1, 2019, issued in connection with European Patent Application No. 15760651.8, 9 pages.

European Patent Office, Extended European Search Report, dated Jul. 12, 2017, issued in connection with European Patent Application No. 15760651.8, 9 pages.

European Patent Office, Result of Consultation dated Nov. 22, 2019, issued in connection with European Patent Application No. 15760651.8, 3 pages.

International Search Authority, International Search Report and Written Opinion, dated Oct. 5, 2009, issued in connection with International Patent Application No. PCT/US2009/047688, filed on Jun. 17, 2009, 9 pages.

International Search Authority, International Search Report and Written Opinion, dated Mar. 28, 2012. Issued in connection with International Patent Application No. PCT/US2010/046524, filed on Aug. 24, 2010, 8 pages.

International Searhing Authority, International Search Report and Written Opinion dated Nov. 24, 2015 issued in connection with International Patent Application No. PCT/IN2015/00128, filed on Mar. 16, 2015, 10 pages.

Ricci, F., et al., Recommender Systems Handbook, Oct. 28, 2010, Springer. [Retrieved from the internet on Jun. 1, 2020: <URL: https://link.springer.com/book/10.1007/978-1-4899-7637-6>].

Liu et al., "Peer Feedback: The Learning Element of Peer Assessment," Teaching in Higher Education, Jul. 2006, pp. 279-290, vol. 11, No. 3.

Russell, M.A., et al., "Mining the Social Web: Data Mining Facebook, Twitter, LinkedIn, Google+, GitHub, and More", Oct. 20, 2013. [Retrieved from the internet on Jun. 1, 2020: <URL:https://books.google.com/books?hl=en&lr=&id=_VkrAQAAQBAJ&oi=fnd&pg=PR4&dq=Mining+the+Social+Web:+Data+Mining+Facebook,+Twitter,+LinkedIn,+Google%2B,+GitHub,+and+More&ots=JrrrlxXtjJ&sig=_86wvCXz_MV2LM0TXTSgPqXVV20#v=onepage&q=Mining%20the%20Social%20Web%3A%20Data%20Mining%20Facebook%2C%20Twitter%2C%20LinkedIn%2C%20Google%2B%2C%20GitHub%2C%20and%20More&f=true.

Wikipoedia: "Expertise Finding", Internet Article, Apr. 25, 2013, [Retrieved from the internet on Jan. 28, 2019 <URL:https://en.wikipedia.org/w/index.php?title=Expertise_finding&oldid=552151957>].

Wikipedia: "Data Mining", Internet Article, Mar. 13, 2004, [Retrieved from the internet on Jul. 3, 2017: <URL:https://en.wikipedia.org/w/index.php?title=Data_mining&oldid=599484738>].

FIGURE 1 (contd.)

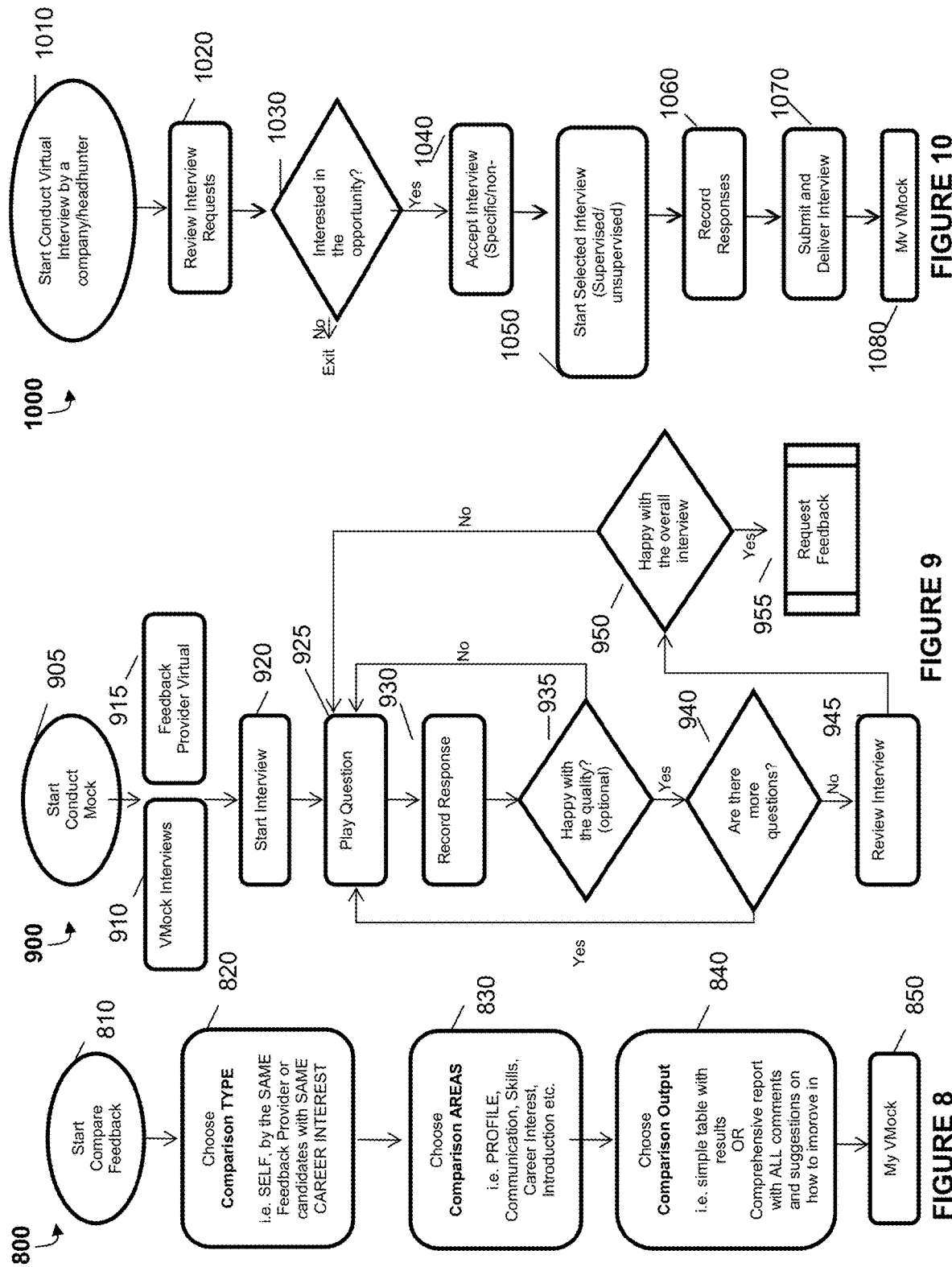

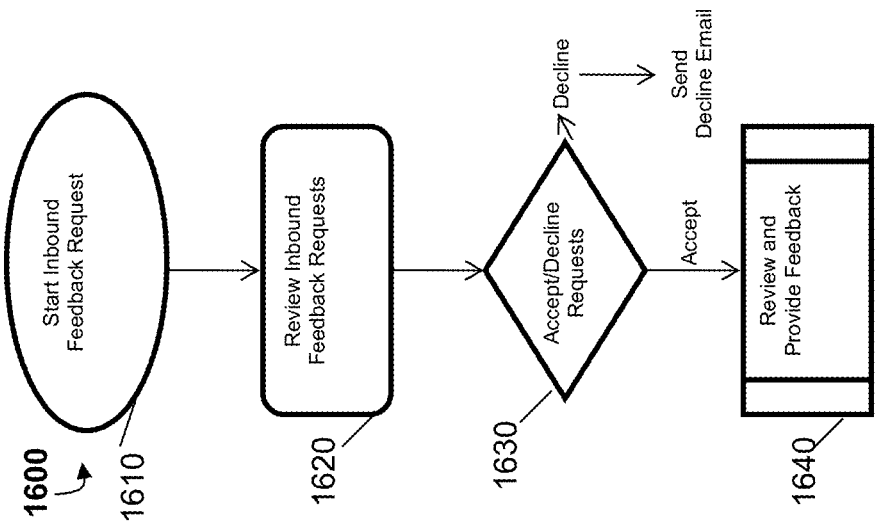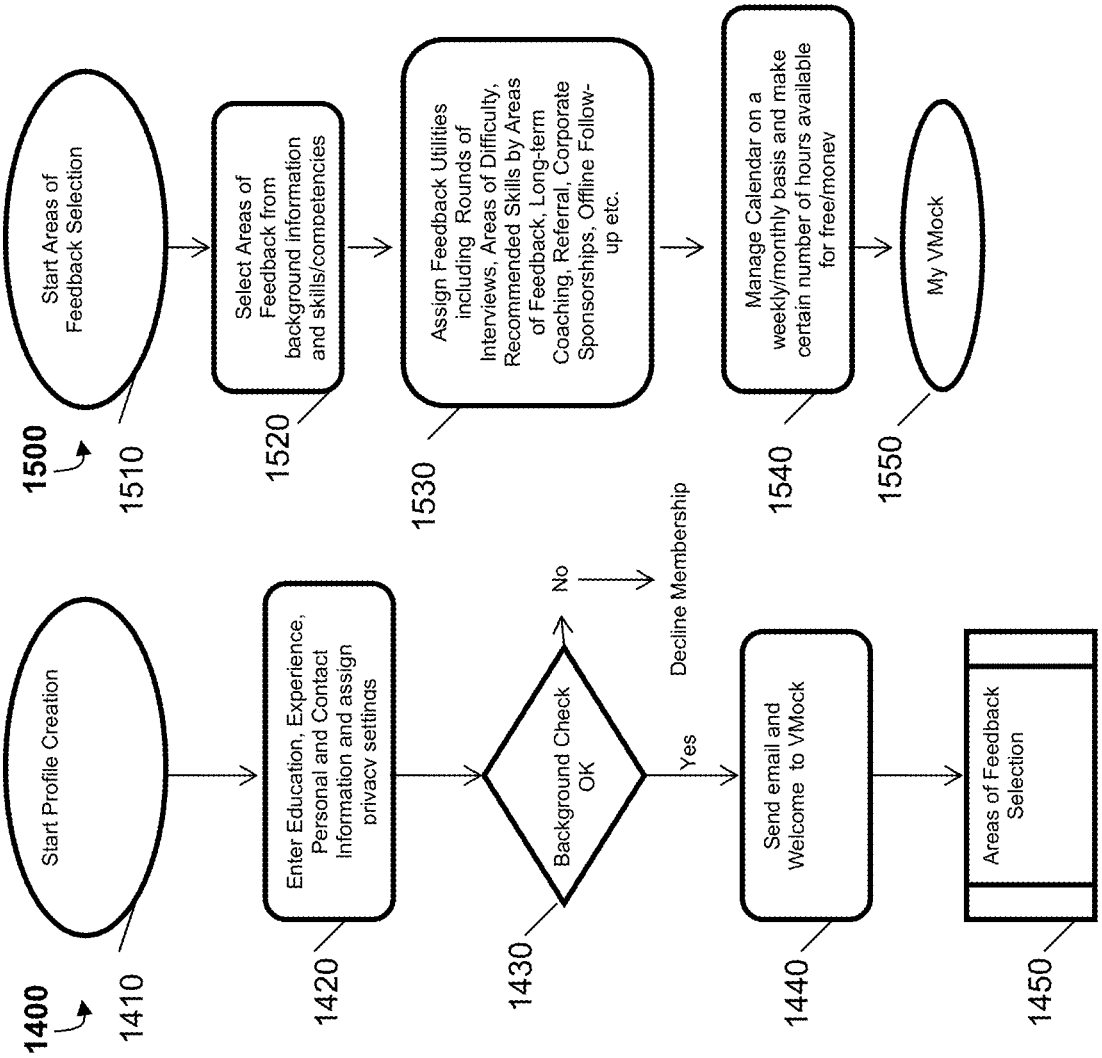

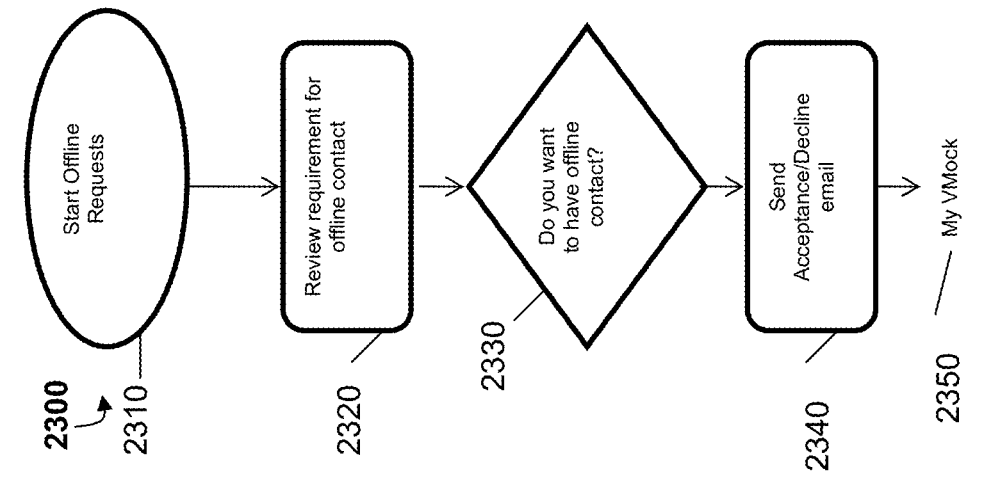
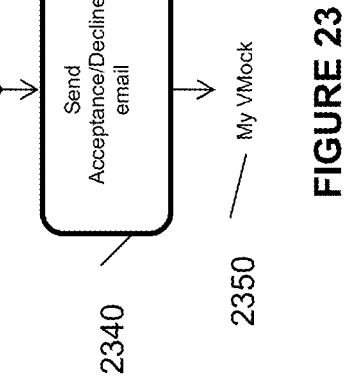
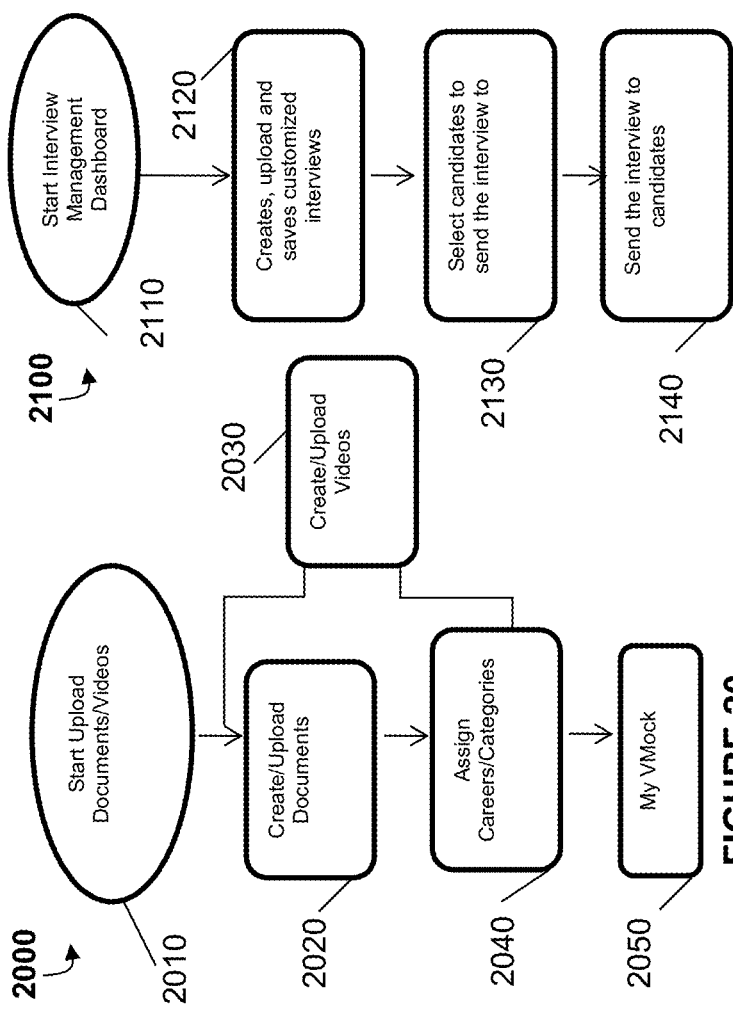
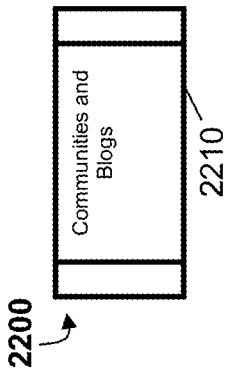

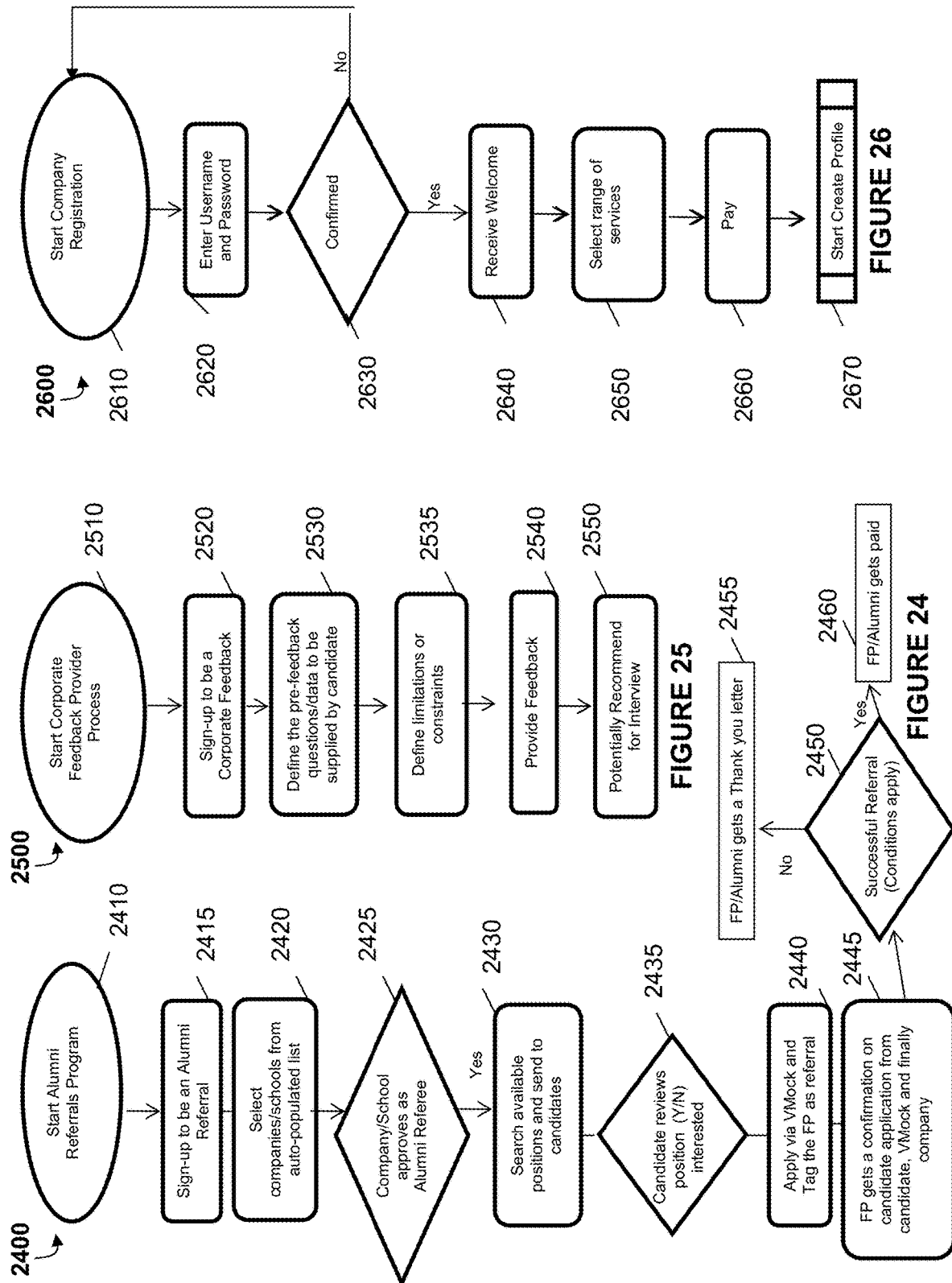

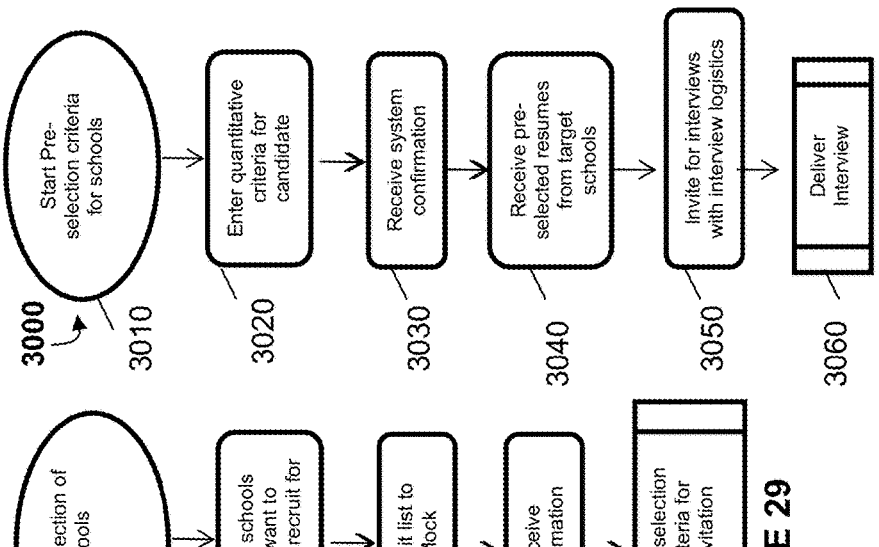
FIGURE 30
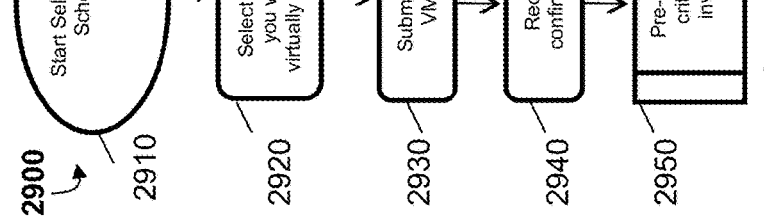
FIGURE 29
FIGURE 28
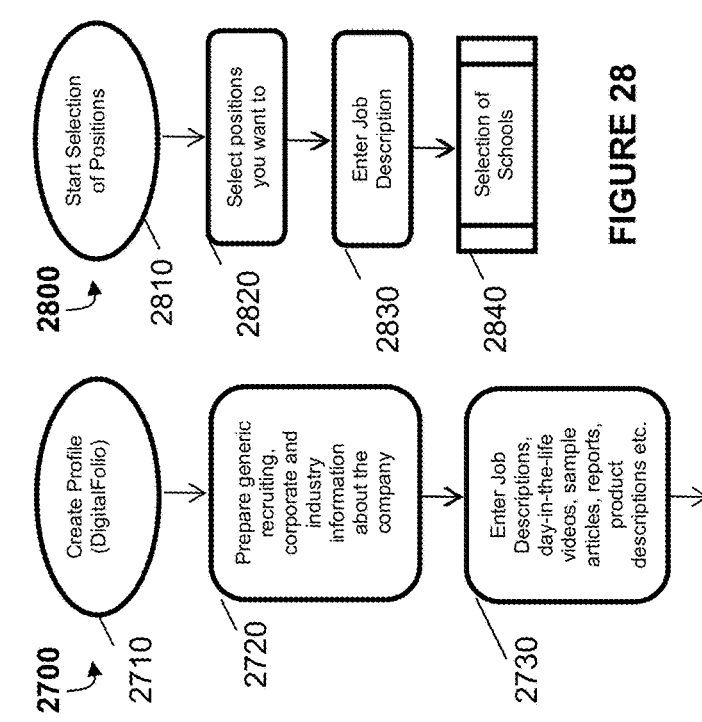
FIGURE 27

INTERNET-BASED METHOD AND APPARATUS FOR CAREER AND PROFESSIONAL DEVELOPMENT VIA STRUCTURED FEEDBACK LOOP

CROSS-REFERENCE TO RELATED APPLICATIONS

The present application is a continuation application of U.S. patent application Ser. No. 16/410,424, filed May 13, 2019, which is a divisional application of U.S. patent application Ser. No. 12/486,595, filed Jun. 17, 2009, which claims priority to U.S. Provisional Patent Application No. 61/073,245, filed Jun. 17, 2008, and to U.S. Provisional Patent Application No. 61/155,803, filed Feb. 26, 2009, each of which is entirely incorporated by reference herein.

BACKGROUND OF THE INVENTION

Field of the Invention

VMock stands for Virtual Mock. VMock is a virtual profile of a candidate that includes resume, text, video and document. VMock essentially breaks down a typical skill-focused interview into smaller independent components, and creates a structured process of self exploration and best practice driven guidance to help create a virtual mock for a specific career choice.

Description of the Related Art

The Internet is a worldwide system of connected computer networks. The Internet enables computers of all kinds to share services and to communicate directly, as if they were part of one giant seamless global computing machine. The Internet is currently configured to join together large commercial communications services as well as thousands of university, government and corporate computer networks and other computers. Communications over the Internet is accomplished by defined communication protocols. The World Wide Web is a subset of the Internet that uses a hypertext transfer protocol (HTTP) among others to permit communication between sites. Such communication may be interactive and is referred to as on-line.

With the increasing popularity of the Internet, candidates, employers and communities are increasingly relying on the Internet as a medium to communicate with each other. For example, a number of web sites presently exist that provide bulletin board, recruiting and job placement services and various other services, examples including but not limited to www.monster.com, www.hotjobs.com, www.cruelworld.com, www.jobtrak.com etc. Other references of interest include U.S. Pat. Nos. 5,592,375; 5,758,324; and 5,832,497 which are each incorporated herein by reference in their entireties.

SUMMARY OF THE INVENTION

The present invention overcomes the problems associated with the prior art by providing a comprehensive feedback based career and professional development, leading to the final act of successful skills display. In accordance with a preferred embodiment, the present invention provides an Internet-based apparatus and method for candidates to build their virtual profile by focusing on recommended and other skills critical for their career-of-choice using creative mix of text, audio and video and related documents. This profile is further refined by seeking feedback for improvement from various sources starting from self assessment. In this preferred embodiment, the present invention is implemented within a server and related structure coupled to the Internet. The present invention provides a medium for candidates to 1) Create stories describing every bullet on their resume and link those to qualitative attributes like teamwork, leadership etc 2) Create video snapshots for bullets/stories/attributes and link them all together 3) centrally store relevant documents related to the recruiting process and release these documents for viewing by different stakeholders and employers, where necessary link these documents with attributes discussed earlier and make them public or private; (4) build their contact management system and provide segmentation to describe their Circle of Trust, Professional Network and recruiters/companies (5) Seek and receive specific or general feedback on skill(s) or entire profile(s) (6) Compare structured feedback (quantitative as well as qualitative) from more than 1 feedback providers to identify patterns and specific/targeted improvement opportunities.

Similarly, the present invention provides a medium for feedback providers to (1) build their profile and showcase areas of feedback from their background, and recommend skills necessary to succeed in those areas (2) showcase variety of services that they can help a candidate with i.e. $1^{st}$ or $2^{nd}$ round virtual mock interviews, feedback on skills, mentorship, offline connectivity, video conferencing via VMock and referral in various institutions (3) showcase their communities or affinity groups where they have a deeper personal connection to provide feedback as part of giving back (4) proactively seek out candidates from VMock with mutual interest to place against requirements The present invention will also help companies to virtually visit untapped schools globally and provide a virtual interview to preselected candidates, so that they can be invited for straight final round or in some cases offer final selection itself. Candidates can use VMock to create their DigitalResume (readymade virtual interview) that can be sourced by employers once they have expressed interest in the candidate. In a direct to consumer model, VMock will be offered to companies as an "Interview Board" where companies will post interviews along with the job descriptions. Interested and qualified candidates will take the interview and company will either select for next/final round, reject or extend an offer for the position.

Finally, VMock will be available to community owners who will have significant administrator rights to ensure smooth implementation and adoption and control of the system. The application will also be made available to general public with core career and professional development platform and additional free-agent platform that provides flexibility for them to use VMock for any application of their choice.

Few unique processes built into VMock will be (1) self exploration and a structured virtual feedback process (2) capability to segment contacts based on level of closeness and tag these based on their feedback potential (3) capability to combine quantitative and qualitative feedback via standardization, and comparing structured feedback to identify specific improvement opportunities (4) capability to use video-based digital profile for recruiting that mimics current process and avoids possibility of discrimination (5) capability to turn feedback or recruiting process asynchronous creating tremendous efficiencies and scalability (6) capability to transcribe video to text, match it against dictionary and provide the frequency of filler words used to enhance communication skills substantially (7) capability of creating career roadmaps based on candidate interests and skills and provide them with several different points to connect as they build their career (8) capability to calculate the competency level in the behavioral skills via SoftScore and constantly adjusting the same (9) capability to connect with a feedback provider with specific skills and derive tremendous career value via general feedback, virtual mock interviews etc (10) capability for companies to post virtual interviews linked to job descriptions essentially using VMock platform as an Interview Board to accelerate the candidate sourcing process with improved outcome(s).

BRIEF DESCRIPTION OF THE DRAWINGS

The preferred embodiments of the invention will be described in relation to the accompanying drawings. In the drawings, the following figures have the following general nature:

FIG. 8 is the flowchart that shows how candidate will be able to compare feedbacks;

FIG. 9 is the flowchart that shows how candidate will conduct simulated Mock interviews using VMock;

FIG. 10 is the flowchart that describes how a candidate will take a virtual interview that she has been invited into;

FIG. 14 is the flowchart for Feedback Provider profile creation;

FIG. 15 is the flowchart where feedback provider defines her areas of feedback;

FIG. 16 is the flowchart where feedback provider is reviewing the feedback request to decide whether to provide feedback (inbound request);

FIG. 20 is the flowchart that shows document and video uploading process by the feedback provider;

FIG. 21 is the flowchart that shows the interview loading and sending by the feedback provider;

FIG. 22 is the communities and blogs by the feedback provider;

FIG. 23 is the chart for offline requests management by the feedback provider;

FIG. 24 is chart showing alumni referral program by the feedback provider;

FIG. 25 is the chart showing feedback provider registering as corporate feedback providers;

FIG. 26 is the chart showing company registration with VMock;

FIG. 27 is the chart showing company creating their profile i.e. DigitalFolio;

FIG. 28 is the chart showing company selecting positions it wants to hire via virtual interviews;

FIG. 29 is the chart showing company selecting schools it wants virtual interviews conducted;

FIG. 30 is the chart showing company preselecting candidates and inviting them for the interviews;

In the accompanying drawings, like reference numbers are used throughout the various figures for identical structure.

DESCRIPTION OF THE PREFERRED EMBODIMENTS

Figure 1:
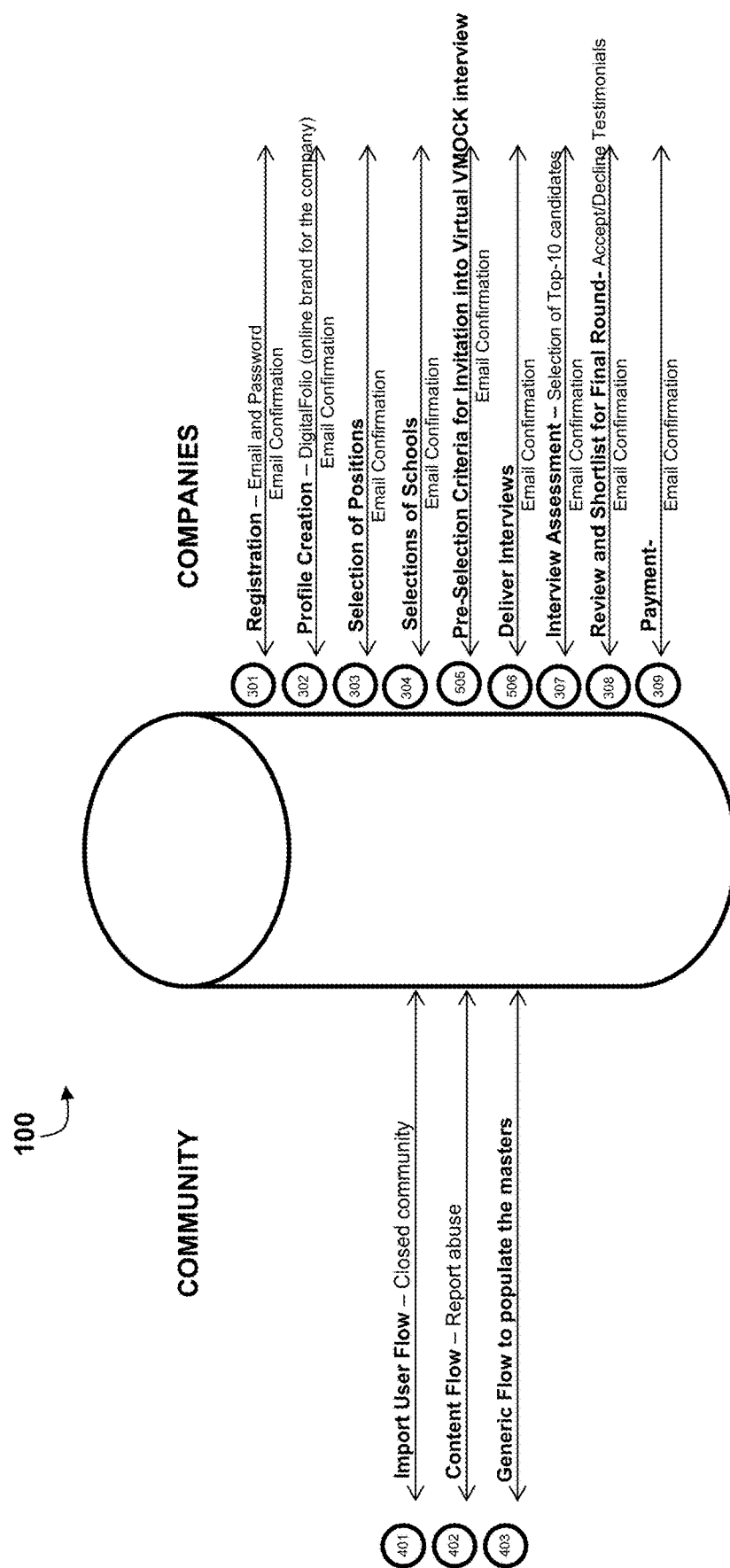
FIG. 1 is a schematic block diagram of the exemplary overall process flow in the system.

The major limitation in current processes and tools focused on candidate career development is that they do not incorporate feedback process critical to enabling the candidate to improve him/herself via integrated self exploration and peer and professional evaluation, and targeted career and professional development. The conventional "look into the mirror" concept of preparation leaves candidates with one of transactions that they cannot review and evaluate let alone share with others for evaluation. Most preparation tools simply focus on establishing physical connection with mentors, and thus lack scale and possess personality bias in the entire feedback process. Also, these methods/tools do not necessarily connect candidates with those feedback providers who have the specific knowledge of the field the candidate is looking to enter and have willingness to share. Same situation exists in several other scenarios e.g. willing leaders within an organization who are known to be experts in specific skills hardly have a systematic means of providing feedback and mentorship to those within the company trying to build the same skill.

The VMock invention relates to a system and method for assisting candidates go through a structured virtual process to build specific skills and also connect with feedback providers who may possess those skills whereby helping the candidate to assess and build the same. More particularly, but without restriction to the particular use, which is shown and described, the present invention relates to an Internet-based apparatus and method for enabling a virtual feedback based platform for career and professional development and advancement. It does so by bringing together feedback seekers or candidates together with feedback providers, employers, coaches, recruiters and other constituencies that can help develop the candidate using the VMock virtual platform ultimately enabling the candidate to pursue their career goals. The platform supports the development of candidates in pursuit of their career goals whether that is pursuit of higher education, careers in any industry, recruiting or professional development of staff within an organization or showcase of skills on age for a contest.

Specifically, VMock invention helps candidates go through a self-exploration process by asking relevant questions and constraining the choices to induce rapid exploration and thinking. It follows a P4SRI Model (Preview-Prepare-Practice-Publish-Share-Review-Improve) and creates a virtual method of asking and receiving feedback on a profile or a portion of it i.e. a specific skill like leadership. Same platform is also extended for virtual recruiting by candidates approaching companies or companies approaching candidates virtually. In an "Interview Board" type functionality, VMock platform will also provide companies the capability to post interviews along with the job description to source candidates in open market. In its simple yet powerful application, VMock turns the feedback and recruiting process "asynchronous" and thus creates tremendous efficiency in the system. Candidate can build multiple audio-visual profile and shares it with feedback providers. And feedback providers provide the feedback to the candidate. Both activities are done separately whenever the candidate or the feedback providers have suitable times respectively. The VMock platform allows candidates to connect with only those feedback providers that can truly add value based on their education and professional backgrounds, and willingness to share the same with the candidate. The system maintains utmost privacy for all members utilizing the platform and each entity can set varying levels of access rights for their own personal information.

The invention has wider application than career development wherever a candidate has to showcase her skills to one or more evaluators in person (live or virtual) and thus video-based information exchange can act as a substitute as a mode of preparation for the ultimate transaction. Successive nature of feedbacks (via self-evaluation, circle-of-trust evaluation, professional/peer group evaluation) helps a candidate prepare for final evaluation by the decision-maker. Simple applications will range from Salesforce training, Leadership development, 360 feedback, Recruiting, Admissions to university/schools, Talent contests, Sports, Medical $2^{nd}$ opinion etc. Application also has strong use into areas where candidate can improve or make substantially better decisions via feedback from its network before trying to execute. Structured Feedback makes it possible to compare multiple sources to eliminate biases and create focused improvement plan.

The present invention discloses a method and apparatus for connecting candidates, feedback providers, employers and other entities in the recruiting ecosystem. In a preferred embodiment, the present invention is implemented as an Internet-based web site. Those skilled in the art will appreciate; however, that the present invention may be implemented within any client/server computing environment (e.g., intranet, extranet, local area network, wide area network, etc.) and that the system may be implemented using general-purpose computer hardware as a network site. The invention may be implemented in a computer system whose actions are directed by a computer program configured as a multiple database information exchange management system. The hardware will be configured and customized by various software modules. The software modules will include communications software of the type conventionally used for Internet communications and a database management system. Any number of commercially available database management systems may be utilized to implement the invention. Those of ordinary skill in the art of database management application programming will be able to make and use the invention according to the disclosure hereof.

The server side of the system includes one or more Web Servers, Media Servers, and a Database Server coupled to the Internet. The Web Server includes an application program in accordance with the present invention. The application program essentially provides a user-interface for users logging-on to the Web Server. The Web Server is coupled to data stored on the Media Server and the Database Server. The Media Server stores images and audio/video content and provides it to the user through the application. The Database Server stores data provided by the users about their education and professional backgrounds in the form of answers to various questions and certain system data, which can be retrieved by various users using the application. For example a candidate enters this data into the system to ensure he/she receives feedback to hone his/her stories to have better impact. Users include candidates, feedback providers, employers and community administrators that may access the system using any computing device connected to the Internet through the World Wide Web or similar graphical technology. For example, the user may access the system through a personal computer (PC), a terminal connected to the Web Server, a Personal Digital Assistant (PDA) or a cellular phone connected to Internet, or any other device used to connect to the Internet. The Web Server will provide different information to these devices based on the connection speed and will use various protocols (e.g., TCP/IP and WAP) to enable communication with these devices.

As discussed above, the present invention provides a system and method for connecting candidates, feedback providers, employers and career development resources. The candidates may be seeking higher education, summer employment, permanent, full-time, jobs or just looking to pursue passions or practice their interviewing skills. To support the same, the present invention provides a technique for candidates to create and store his/her personal information, for feedback providers to create and store their profiles as well as any documents they would like to share with candidates, for employers to create and store company information and load interviews they would like to conduct virtually.

FIG. 1 is a schematic block diagram of an exemplary overall process flow in the present invention. As shown in the figure, there are four key processes in all:

1. Candidate preparing VMock, sharing for feedback, taking virtual interviews, receiving feedback and performing analysis to improve and virtually applying using DigitalResume
2. Feedback Providers providing feedback on the basis of their backgrounds to candidate VMock based on their backgrounds and providing customized one-on-one virtual interviews and specific guidance
3. Companies performing virtual interviews to recruit students from not-visited campuses and accessing candidates from open market in VMock application as an Interview Board 4. Communities taking advantage of VMock B2B services for its members for recruiting, professional development, music & entertainment, school/university admission etc.

These processes are further divided into various sub-processes, details on which have been provided in following sections.

I. Candidate Process Flow

The system provides the candidate with the platform to build a virtual profile consisting of audio, videos, text and documents that can be used to prepare and present for interviews. The system allows the candidate to build this profile in the form of a virtual mock interview that can be reviewed for self-assessment as well sharing with those in their circle of trust, their professional network as well as VMock feedback providers. The VMock platform provides the candidate with all related support needed to build their profiles and their specified career tracks in the form of VMocks. These VMocks simulate an interview with the platform providing the candidate with relevant questions and related resources such as sample profiles, resumes, documents, etc.

Essentially, a candidate enters the VMock platform knowing career tracks that he/she has interest in. Once a career choice is selected by the candidate from the list of various career choices (or a career choice may be entered using free form text), the VMock platform asks for three top target companies for that career choice and relevant positions for the those three target companies If there are feedback providers on the VMock platform with that background, system gives a count to the candidate to allow possibility of targeted connection and create instant gratification. The VMock platform may ask the candidate to upload a resume customized for a given career choice. Sample resumes are provided, perhaps for reference purposes. Once a resume is uploaded, the VMock platform checks for keywords in the resume for that career choice and provides a match value. The match value may indicate how likely the resume will get a hit when searched by companies or recruiters looking for a candidate for that position.

The VMock platform may request that the candidate to prepare his/her answer to various questions like "walk me through your resume" and "interest in the career choice". Various samples and suggestions may be made available for the candidate to review and then he/she prepares the response by using a form to input three top highlights describing his/her response. Then the candidate may practice the response using a webcam integrated in the VMock platform. The candidate may preview, re-record or publish the response.

The candidate may prepare a skill profile by answering question(s) pertaining to each skill using a Highlight, Situation, Action and Result (HSAR) framework. The candidate, if necessary, may attach a relevant document with the skill profile, review various relevant samples, and finally practice using a webcam integrated with VMock platform for recording, previewing, re-recording. Once perfected, the candidate can publish this skill profile and add it to his/her VMock. It is possible that candidate may have built other skill profile (s), and he/she can attach the same for the current VMock. The candidate can repeat this process for other skills.

VMock can include answers to one or multiple skills and/or questions i.e. a Leadership skill VMock or a Consulting Career. For example, a consulting career VMock may have multiple questions and skills embedded in it, while a leadership skill VMock may provide answers to only one question and example of leadership situation for the candidate.

The VMock platform will adjust the relevance of its content by allowing user input and recommendation where appropriate. For example, users will rate sample videos and the system will display the highest ranked videos in the sample area. Further, across the site the user will be provided with access rights management where they can choose privacy setting of any personal information on the site for example the candidate can choose entire profile/VMocks to be made public if desired. Finally, all activities will have a date and time stamp across the site.

The candidate process flow consists of the following:
200 Candidate Registration
300 Profile Creation
400 Build VMock
500 Contact Management
600 Request Feedback—Personal Network
600 Request Feedback—VMock Network
700 Review Feedback
800 Compare Feedback
750 Rate Feedback Provider
760 Request Offline Follow-up
900 Conduct Mock Interviews
1000 Conduct Virtual Interviews Delivered by Companies
1100 Prepare DigitalResume and Apply for the job
1200 Candidate SoftScore Each of these and the other aspects are discussed in further detail herein.

a. Candidate Registration (200)

Figure 2:
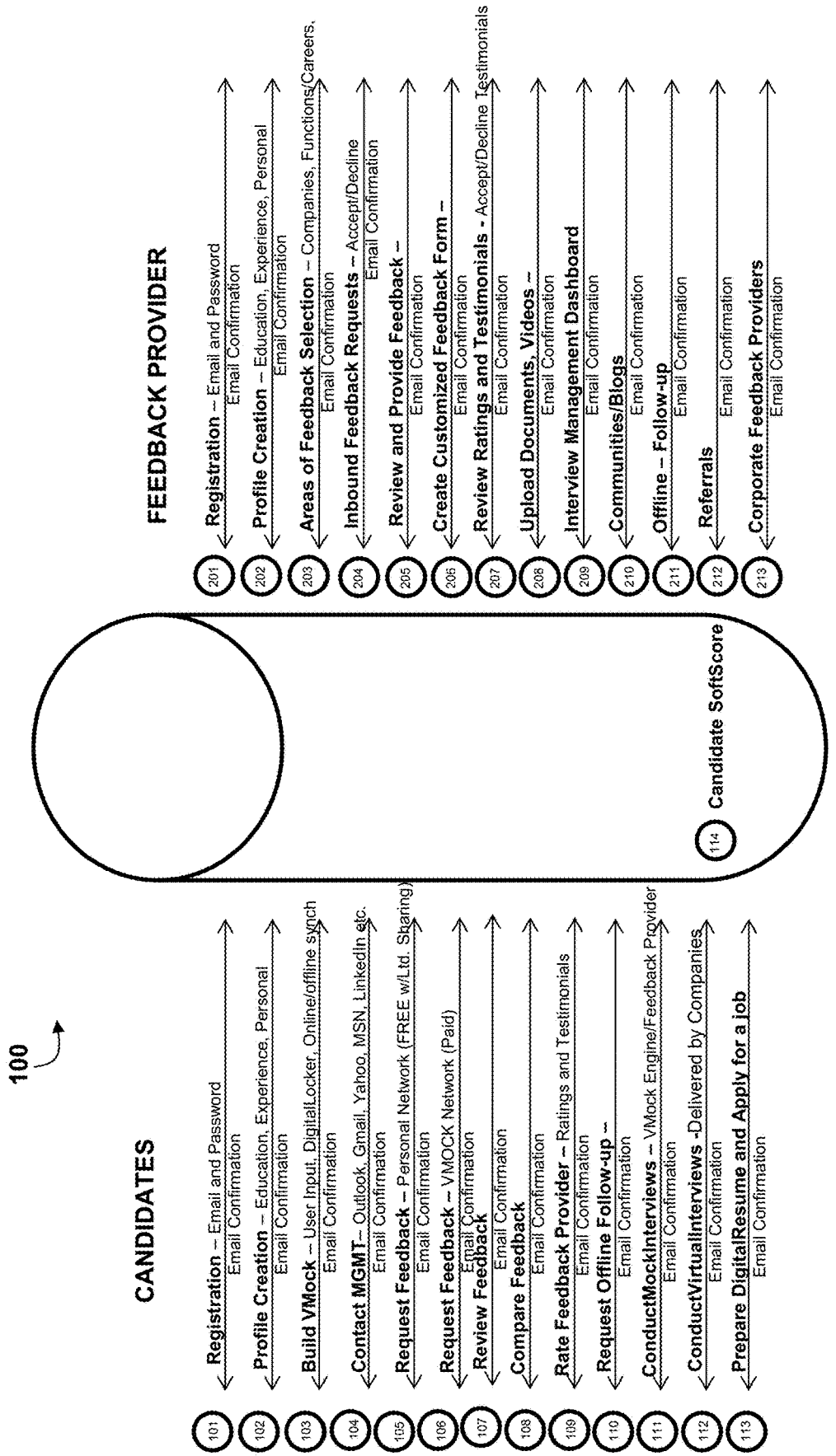
FIG. 2 is the flowchart for candidate registration.

In a preferred embodiment, before the candidate can utilize the services and features of the system of the present invention, the candidate must first register with the system. FIG. 2 is a flow chart illustrating the general registration process for a new candidate to the system. In step 210, the candidate begins the registration process via the VMock platform. In step 220, the candidate enters his/her user name which is his/her e-mail address and selects a password. He/she also chooses their career preferences upon which the system will be customized for the user upon acceptance into the platform. Here the career preferences are a) interested in job b) interested in higher education c) interested in both. The system checks if the user is legitimate (230) by checking the validity of the e-mail and have him/her accept a terms of agreement document that focuses on the correctness of the data. Once the user does this, the system sends a confirmation e-mail (240) to their e-mail address, after which the candidate logs back into the system using the information in the e-mail and their e-mail address and password and moves on to the Profile Creation process (260). If the candidate does not pass as a legitimate user the systems sends a decline e-mail (250) or puts an error message stating that the registration has failed and that the information provided is not valid. If the user still wants to register with the system they have to repeat the process.

b. Profile Creation (300)

Figure 3:
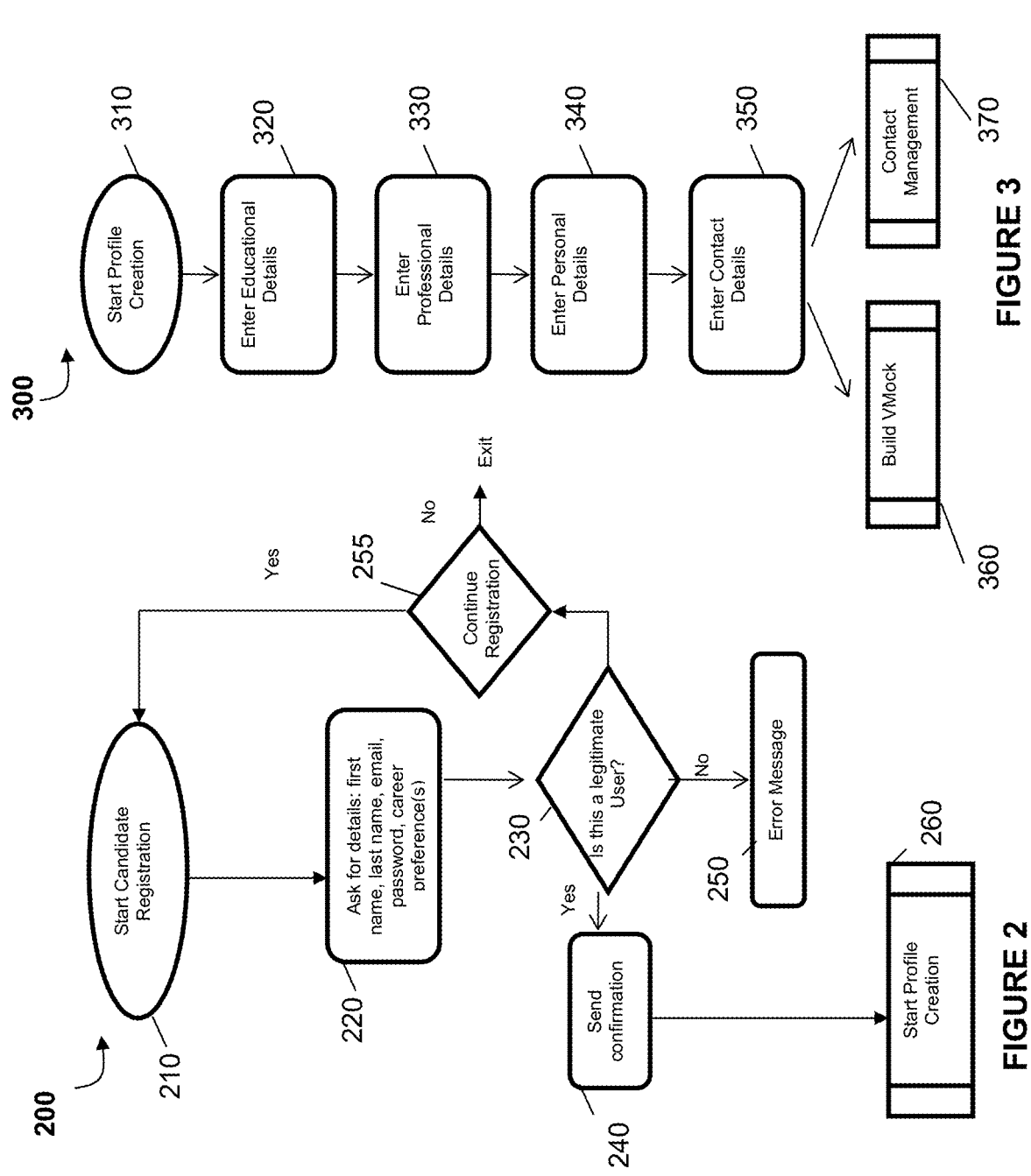
FIG. 3 is the flowchart for candidate profile creation.

As FIG. 3 shows, the Profile Creation (310) process enables the candidate to enter information about him/herself into the system that serves as the foundation for leveraging and using the VMock platform utilities and services. The candidate begins by entering his/her educational background details (320) such as school, degree, year, concentration etc, then enters his/her professional background details (330) such as name of the company, position, career area etc, and then enters personal information as well (340), such as hobbies, sports etc. In the next step (350), the candidate enters his/her contact information that will enable feedback providers and other system users to contact the candidate, if the candidate allows the contact information to be available to them. The candidate can also choose which of this information will be available to others and which will be private by selectively going into the system and changing the settings. Once the candidate has entered all this information they can choose to build their VMock (360) or begin the contact management process (370).

c. Build Career VMock (400)

Figure 4:
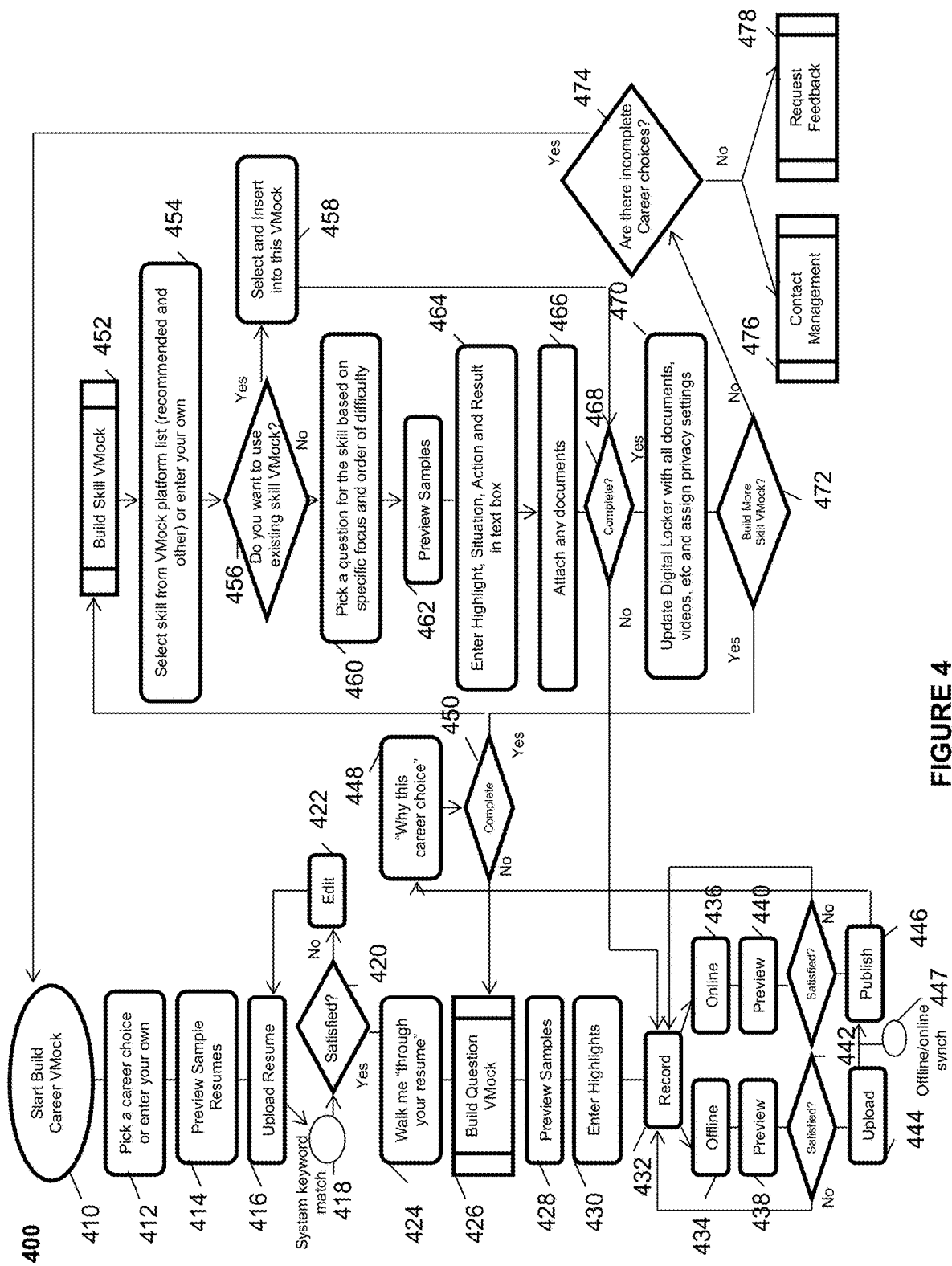
FIG. 4 is the flowchart that shows candidate VMock building process.

FIG. 4 illustrates the flow-chart for the Build Career VMock process that the candidate uses to build his/her VMocks. The candidate starts the process in (410) in the Start Build Career VMock step. Next the candidate chooses the career choice from the list of choices provided by VMock or enters his/her own in a text box (412). In the next step (414), the candidate previews sample resumes before uploading his/her own (416). Once the candidate uploads the resume the VMock system does a keyword match (418) searching the candidate's resume for keywords related to the career choice and provides a percentage match based on the number of keywords present and recommends top five keywords for that career choice to be incorporated in the resume. Based on whether the candidate is satisfied (420) with the percentage match the candidate can choose to edit his/her resume or not to include keywords not present.

Once the candidate is satisfied with his/her resume they begin to answer the first question "Walk me through your resume" (424) and moves into the Build Question VMock (426) process. In the next step (428), the candidate previews sample responses and then enters three bullets that highlight his/her response in a text field (430). In the next step, the candidate moves on to record (432) his/her response. The candidate can do this in online (436) or offline (434) mode. To do this recording in the offline mode the candidate downloads a plug-in and records his response on his own hard drive rather than the VMock server. In the next step (438) and (440) based on whichever mode the candidate chose he/she can preview what he/she recorded. The VMock system will identify the frequency of filler words such as like, uhm, etc and other keywords by transcribing the video to text, matching against the dictionary and checking the script for frequency of these words. If the candidate is satisfied (442) with the recording he can either upload (444) or publish (446) the recorded video based on the mode he/she was in. If the candidate was in the offline mode then the VMock system conducts an offline/online synch (447) and updates the online system with the video that the candidate uploaded.

Next, the candidate moves on to answer the "Why this career choice?" question (448) and repeats the Build Question VMock (426) process described above for the same. If the answer is not complete (450), the candidate records (432) his/her response and goes through the process again. If the candidate is satisfied with the question response, he/she moves onto the next process Build Skill VMock (452). The candidate selects the skill whose VMock he/she would like to build from a list of skills provided by the VMock platform (454). Skills recommended for that career choice are highlighted in this list. The candidate can also enter his own skill if necessary (454). In the next step (456), if the candidate has already built a skill VMock that he/she would like to use for this skill, he/she can pull this skill VMock and insert it as part of this career choice VMock. If the candidate does not have an already built skill VMock, he/she picks a question corresponding to that skill based on the specific area of focus and order of difficulty from the VMock Interview Engine (described in detail in FIG. 35). Next, the candidate can preview sample responses (462) and then enters his response in a text form using the Highlight, Situation, Action and Result (HSAR) format (464). In step 466, the candidate uploads any documents he/she would like to attach as part of this skill VMock. Next, the candidate moves onto record (432) his/her response via the process described earlier in the "Walk me through your resume" process. If the candidate is satisfied with his/her response and considers it complete (468) he/she can update his/her DigitalLocker with all the relevant materials (text, audio, video) and assigns privacy settings (470). This ensures that the candidate is in control of any overwrites, deletes etc.

If the candidate wishes to build more skill VMocks (472), he/she repeats the process described above and starts in step 452. If the candidate does not wish to add any more skill VMocks to this career VMock, he/she can build another career VMock that he/she is interested in (474). If the candidate wishes to do so then the candidate begins the Build Career VMock process all over (410), else the candidate can move onto manage his/her contacts (476) or begin the Request for Feedback process (478).

The VMock platform provides each candidate with a DigitalLocker where all documents (text, audio and videos) are stored. These include all the documents the candidate has created, and uploads into the VMock system such as recorded videos, resumes, text forms, learning documents, and any other career related documents. The documents, videos etc can be those from existing VMocks or additional that are not currently part of any VMock or DigitalResume but will eventually plan to use e.g. transcripts, references etc. The items in the DigitalLocker will all have privacy settings set by the candidate based on who in his contacts get access to what capability. The privacy settings include public, and private settings that the candidate selects to make the documents visible to others or keep private in his/her own profile.

The VMock platform will provide the capability where necessary to utilize the functionality and processing in both an offline and online mode with the ability to synch between these two modes. For example, when a candidate is practicing his or her story using a webcam a simple application will be downloaded to enable the webcam practicing process to utilize the local client environment i.e. thick client. Next time, the user will login to her/his VMock account on the Internet, she/he will be given a choice to synch files from a specific folder to her/his DigitalLocker. Essentially, a folder structure is created in the candidate hard drive replicating the VMock structure that candidate has on VMock platform. The data is synchronized with user permission once user logs into his/her account on VMock.

The candidate may provide response(s) to one or more questions using a VMock that has a story form. The story form may have one or more questions, with a short answer and/or a long answer for each question. The short answer may be provided as text and may summarize the long answer. The long answer may be provided as video content. In some cases, where the question will relate to a situation dealing with a skill that candidate possess, he/she will use a Highlight, Situation, Action and Result format to prepare the story, which will be presented in the attached video. For example, the question may be "Tell me why you like consulting" and the candidate may write a short answer of "Overcoming challenges/helping others". The candidate may also attach a video answering the "Tell me why you like consulting" question as the long answer. Other formats, such as audio, other video and/or textual formats, for the short answer and/or the long answer are possible as well.

d. Contact Management (500)

Figure 5:
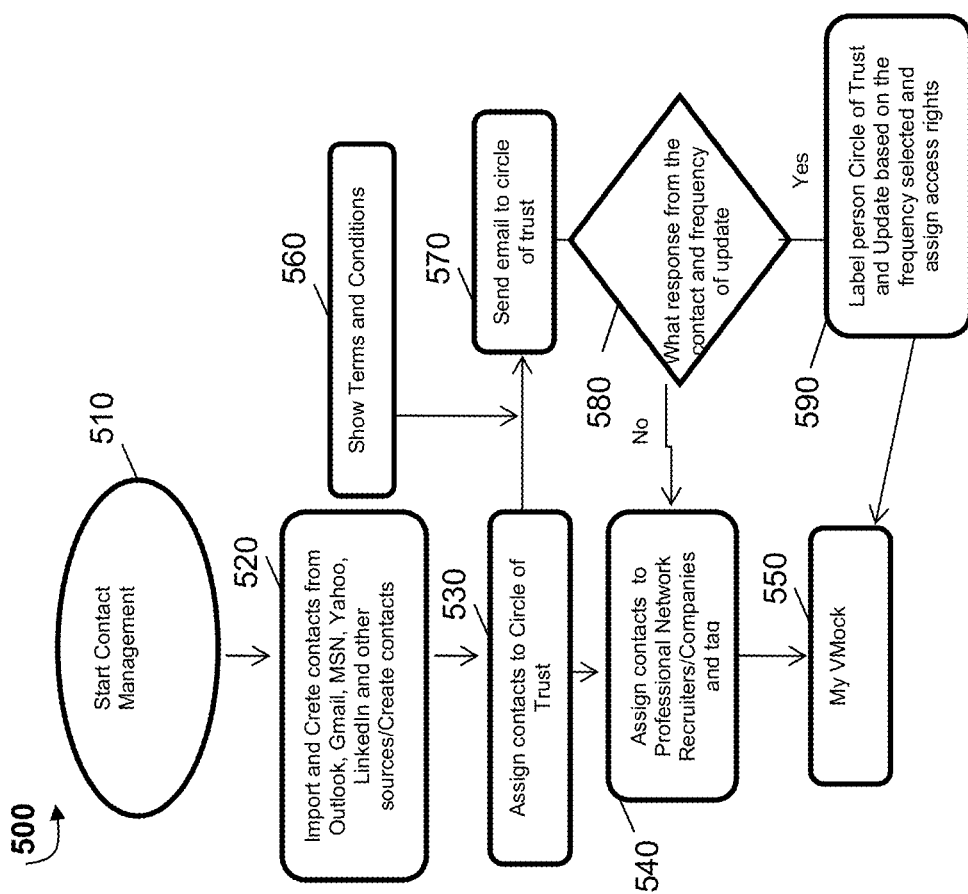
FIG. 5 is the flowchart describing how candidate will perform contact management.

The VMock platform allows the candidate to manage his/her contacts within the system. FIG. 5 describes this process. The candidate begins this process in step (510). In following step (520), the candidate imports contacts from various e-mail and networking sites such as Outlook. Gmail, LinkedIn, and others where the candidate may have already stored this information. The candidate selects the contacts from the list he/she wishes to import by selecting the contacts. For those contacts that the candidate considers to be in his/her circle of trust, the candidate assigns the circle of trust (530) status. Candidate can have up to 5 circles with different levels of trusts. In step (560), the candidate views the terms and conditions for assigning contacts the circle of trust status. The terms and conditions include access rights, frequency of interactions and timeline for suggested relationship. An e-mail is then sent to the selected contact (570) and the candidate awaits an approval from the contact (580) about their willingness to be part of the candidates' circle of trust. If the contact agrees then the contact is placed in the candidate's circle of trust (590). If the contact disagrees, then the candidate can place the contact in the category of professional network (540) and the contact is not sent any corresponding e-mail.

In addition to assigning contacts in its network with the circle of trust status, the candidate can also place imported contacts in his/her professional network, and recruiter and companies categories (540). The VMock platform will also provide a more sophisticated tagging capability for candidates to tag their contacts based on profession, skills, role or any other relevant categories and create groups. For example, if Mr. Smith has a strong background in Mergers and Acquisitions, then he will be tagged M&A and placed with others in the M&A group. The candidate will also be able to assign follow-up actions to contacts, whose reminders will be sent via chosen method of communication such as e-mail/SMS or pop-ups when the user logs into the system. The follow-up actions will be based on the interactions that the candidate has with the contact, for example if the candidate has received feedback and would like to follow-up in a week's time, then he can assign the contact that follow-up in the system and set up reminders.

e. Request Feedback—Personal Network (600)

Figure 6:
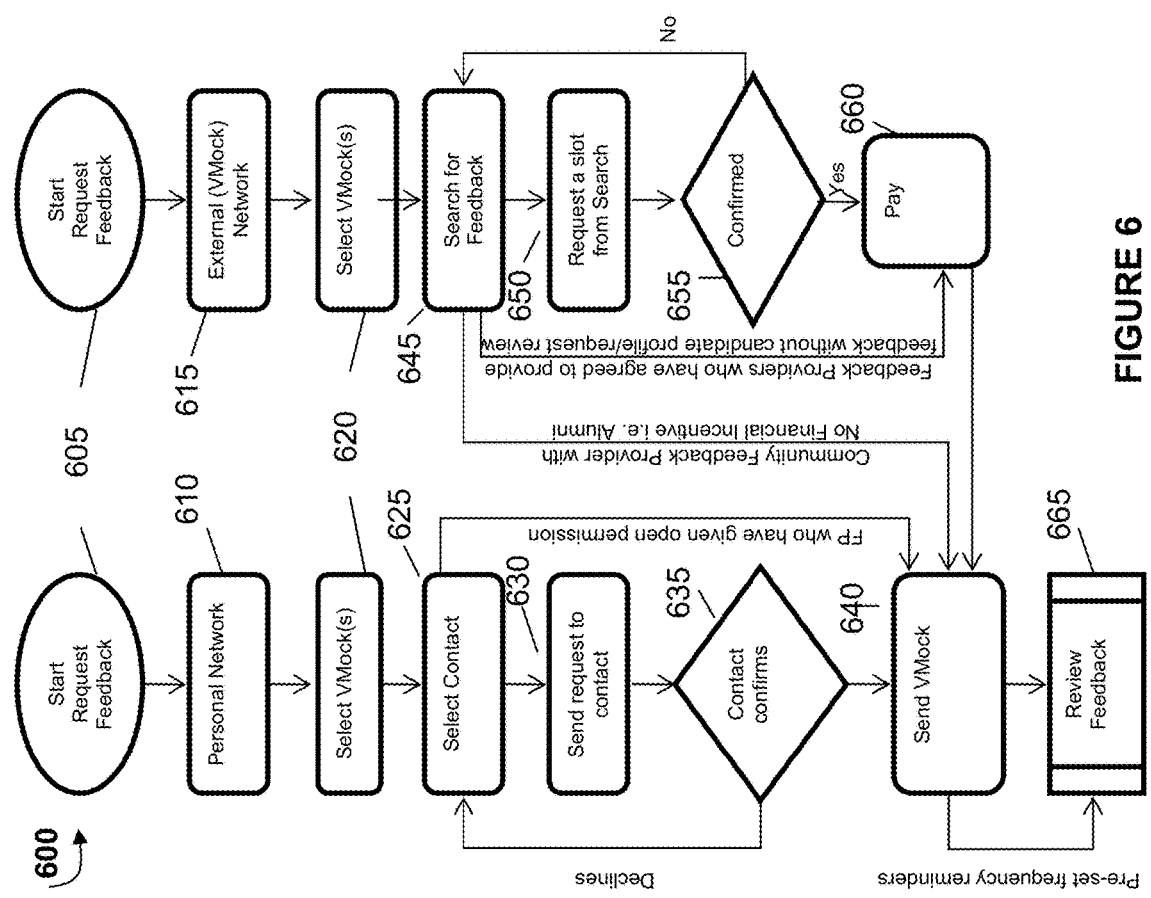
FIG. 6 is the flowchart describing how candidate will request for feedback within/outside her network.

Once the candidate has built their VMocks and reviewed them him/herself, the VMocks are ready to be shared with others for feedback. FIG. 6 illustrates this process. The candidate can choose to share his/her VMocks with those in his/her contact management system (610). In the next step (620), the candidate selects the particular VMocks that he/she would like to receive feedback on and can attaché an optional job description for feedback provider review. These are a combination of the career choices, skills or any component that the candidate has included in his/her VMock, or the entire VMock(s) itself. The candidate then selects the contact from his/her contacts (625) and sends the request for feedback to the contact (630) to ensure alignment of expectations with the response time. If the contact agrees with (635) the request then the candidate sends his/her VMock to the contact for feedback (640). In other cases, when feedback provider has provided open access to candidates, it is not necessary to ask for permission for feedback rather share the VMock straight away. Once the contact provides feedback on the VMock, the candidate can review the feedback (665). If the contact does not confirm (635) the request then the candidate can go back and select another contact to send the request to (625). Candidate can select multiple contacts and send the VMock(s) to them simultaneously as well.

f. Request Feedback—External (VMock) Network (600)

The candidate can also choose to send his/her VMock to VMock feedback providers. In situations where VMock has been implemented as a business-to-business application, these will be the feedback providers from that community e.g. alumni from a school. FIG. 6 illustrates this process. The candidate begins the request for feedback process (605) from VMock feedback providers (615). The candidate selects particular VMocks he/she would like to receive feedback on (620) and can attaché an optional job description for feedback provider review. These are the same areas of feedback as described in (e) above. The candidate then searches for feedback providers (645) on the VMock platform according to specified criteria. The candidate selects these criteria before beginning his/her search for feedback providers. The criteria are based on feedback provider areas of feedback, and thus provided by the system and include a wide variety of ways for searching for feedback providers including but not limited to based on career choices, prior work experience, location, educational and professional profile, rating, etc. For those feedback providers that have agreed to provide feedback requests without needing an approval first, the candidate selects a slot that is a virtual slot equivalent to a time slot on someone's calendar in real world, and pays for the feedback if the feedback is not free (660). The candidate pays for the slot using an online payment system using their credit card, or paypal. The candidate then sends the VMock to the feedback provider for feedback (640) and reviews feedback once received (665). If the selected feedback provider would like to approve requests first then the candidate sends a request for a slot (650). If the feedback provider agrees with the request (655), then the candidate pays (660) if necessary and sends his/her VMock (640) and reviews feedback once received (665). The feedback includes a combination of text, audio, video based on the feedback form that the feedback provider uses to provide feedback. Feedback is provided on both content and communication. The feedback has both the quantitative rankings as well as qualitative comments.

g. Review Feedback (700)

Figure 7:
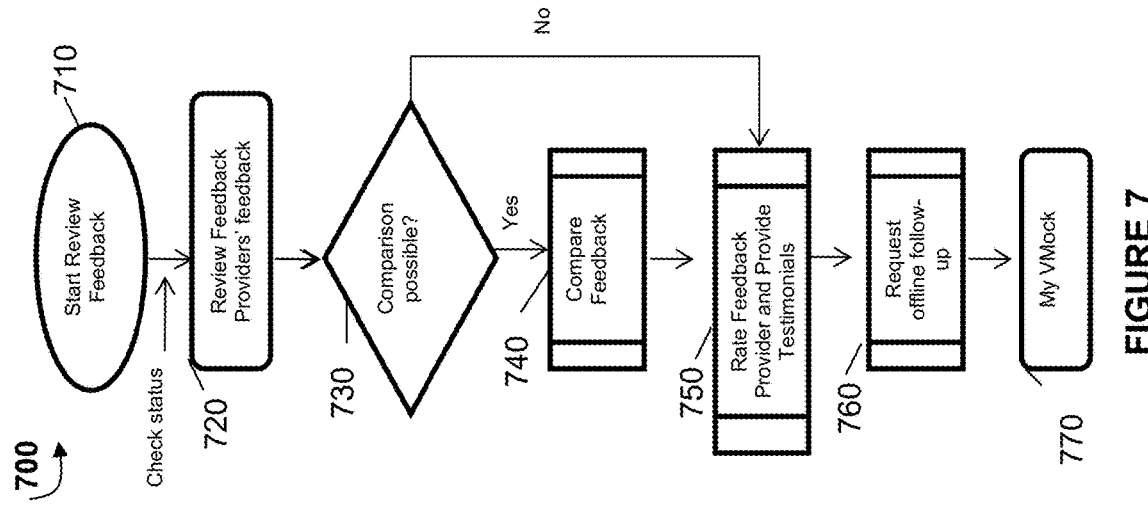
FIG. 7 is the flowchart where candidate reviews feedback that she has received.

Once the candidate has sent his/her VMock for feedback and the feedback provider has reviewed the VMock and given feedback, the candidate can now review the feedback received. FIG. 7 illustrates this process. The candidate begins the review feedback process in step (710) and in this process can review all feedbacks received. In step (720), the candidate reviews the feedback providers' feedback. If the candidate can compare this feedback (730) to other feedbacks based on different options provided by the VMock platform, then the candidate can begin the compare feedback process (740).

h. Start Compare Feedback (800)

FIG. 8 describes the compare feedback process. The candidate begins the compare feedback process in step (810). The candidate selects the type of comparison he/she wishes to run (820) such as feedback comparison on a particular VMock by multiple feedback providers, feedback comparison amongst multiple candidates on same VMock by the same feedback provider or comparison amongst those candidates with same career interest registered on VMock platform. In the next step (830), the candidate selects the areas that he/she would like to run the comparison utility such as overall profile, specific skills, career interest, across specific questions, etc. The candidate then chooses the type of report he/she would like to see (840) such as simple report with just quantitative scores, summaries of qualitative comments/feedback, or a comprehensive report that is customized with action items on how to improve. A comprehensive report has details of improvements by various sub-categories of content and communication. This report will have summary of both qualitative and quantitative scores in the beginning and then elaboration of how to improve in specific areas where the candidate has consistently received low scores.

If the candidate cannot compare feedbacks or chooses not to do so, the candidate can move on to rate the feedback provider in step (750). The candidate can also conduct this process once he has compared feedback on the VMock platform. After rating the feedback provider, the candidate can also send the feedback provider an offline contact request (760).

i. Rate Feedback Provider and Provide Testimonials (750)

The VMock platform provides the capability for candidates to rate the feedback provider and provide feedback on the quality of feedback that they have received from feedback providers. The system will provide standardized forms to gather candidate feedback (qualitative and quantitative) on the services received from the feedback provider. This feedback can be made public to all users of the system when they look up the particular feedback provider. Also, feedback providers can be searched on the basis of their ratings (quantitative scores).

j. Request Offline Follow-Up/Mentorship (760)

Candidates can also request for offline follow-up from feedback providers by sending them a simple request for the same (760). If feedback provider agrees to the offline contact the candidate and the feedback provider can conduct this contact outside the scope of the VMock system. For example, a feedback provider may want to connect with a candidate while the feedback provider is traveling to work on train, creating productivity in the ecosystem. In addition, the candidate can also ask a feedback provider to be a mentor if the feedback provider has made that option available in their profile. The mentorship process only begins once the candidate and feedback provider have had contact and feedback session, and want to take the relationship to more of a mentorship. Feedback provider is then added to the contact management as "Mentor".

k. Conduct Mock Interviews (900)

Once the candidate is comfortable with the VMock he/she has built, and feels ready to conduct virtual interview, the candidate can begin the conduct mock interviews process (905). The candidate can choose to do this in two ways. One via mock interviews provided by the VMock platform (910) and another via interviews delivered to him/her by feedback providers (915). In either case, the candidate when ready starts the interview (920). The candidate starts the interview (925) by pressing the play button on the interview and then records the response (930) using a webcam. The candidate may be allowed one review of the response, if the candidate is happy with the response (935), he can move on to the next question and repeat the process until there are no more questions (940). If the candidate is unhappy then they can rerecord the response using the webcam.

The interviews provided by the VMock platform will be derived from the VMock interview engine, which will host a database of interview questions. The interview questions will be tagged by system according to a number of criteria including but not limited to order of difficulty, career track, skills, etc. The interview engine flow can be seen in FIGS. 35, 36, 37 and 38.

Figure 35:
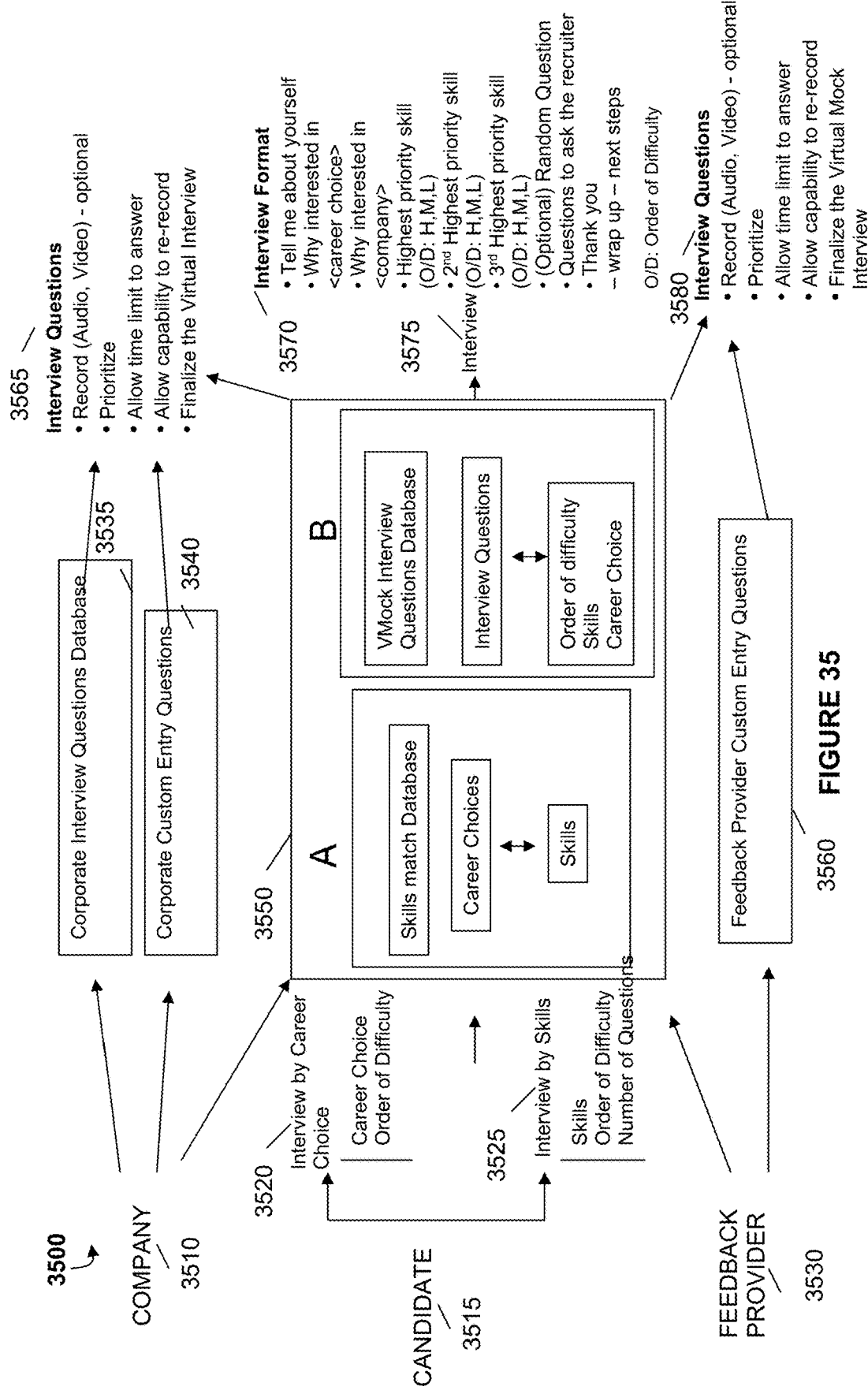
FIG. 35 is the chart showing VMock Virtual (Mock) Interview Ecosystem.

FIG. 35 shows that a candidate can practice mock interviews by career choice by defining specific career choice, level of difficulty and by skills by defining specific skills, order of difficulty and total number of questions he/she wants to practice. Similarly, a company or feedback provider can provide a candidate virtual (mock) interview by using the skills match database, interview questions database, manually entering specific questions or leveraging a local database of questions. Once interview questions are decided, they are prioritized/sequenced, allowed time to answer, capability to re-record or not, and final packaging. Interviewer has a choice of recording these questions (audio, video, text). Interviews are delivered virtually via an email with a link, and candidate takes the interview in a simulated environment. The simulated environment entails a virtual person delivering the question in an interview room type setting, a timer indicating the time remaining to answer the question and total lime limit for that question. Once the interview is completed, the system delivers these to the interviewer for review, analysis and feedback. (Details of the figure and description are mentioned below).

Figure 36:
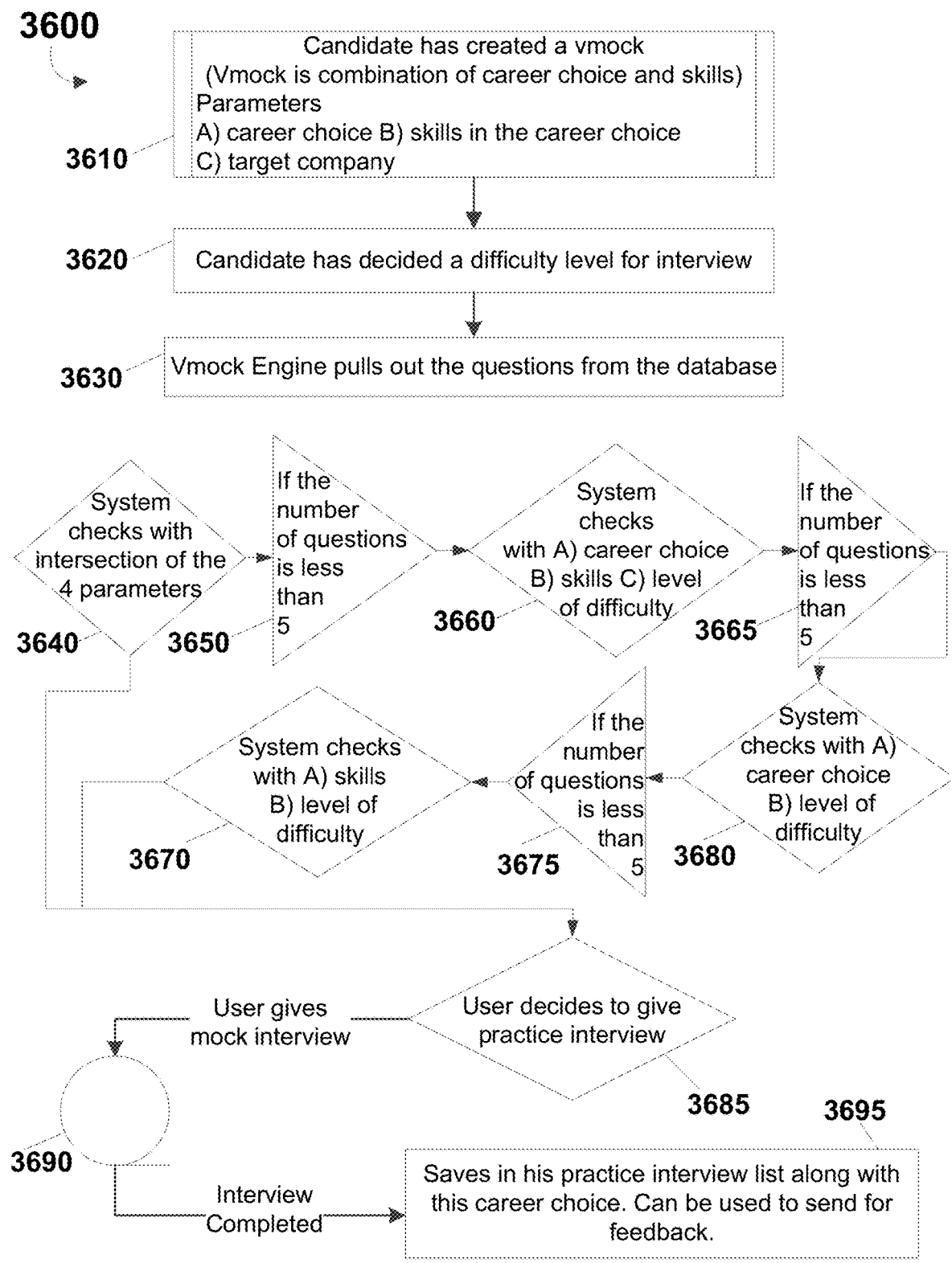
FIG. 36 is the chart showing candidate self virtual mock interview.

FIG. 36 describes the interview process for candidate using the VMock Interview engine. The candidate selects a VMock career choice, or/and skills or/and target company that he/she wishes to conduct the interview and the order of difficulty. Once the interview is complete the candidate saves his/her interview in his/her digital locker and can obtain feedback on this in the future. (Details of the figure and description are mentioned below).

Figure 37:
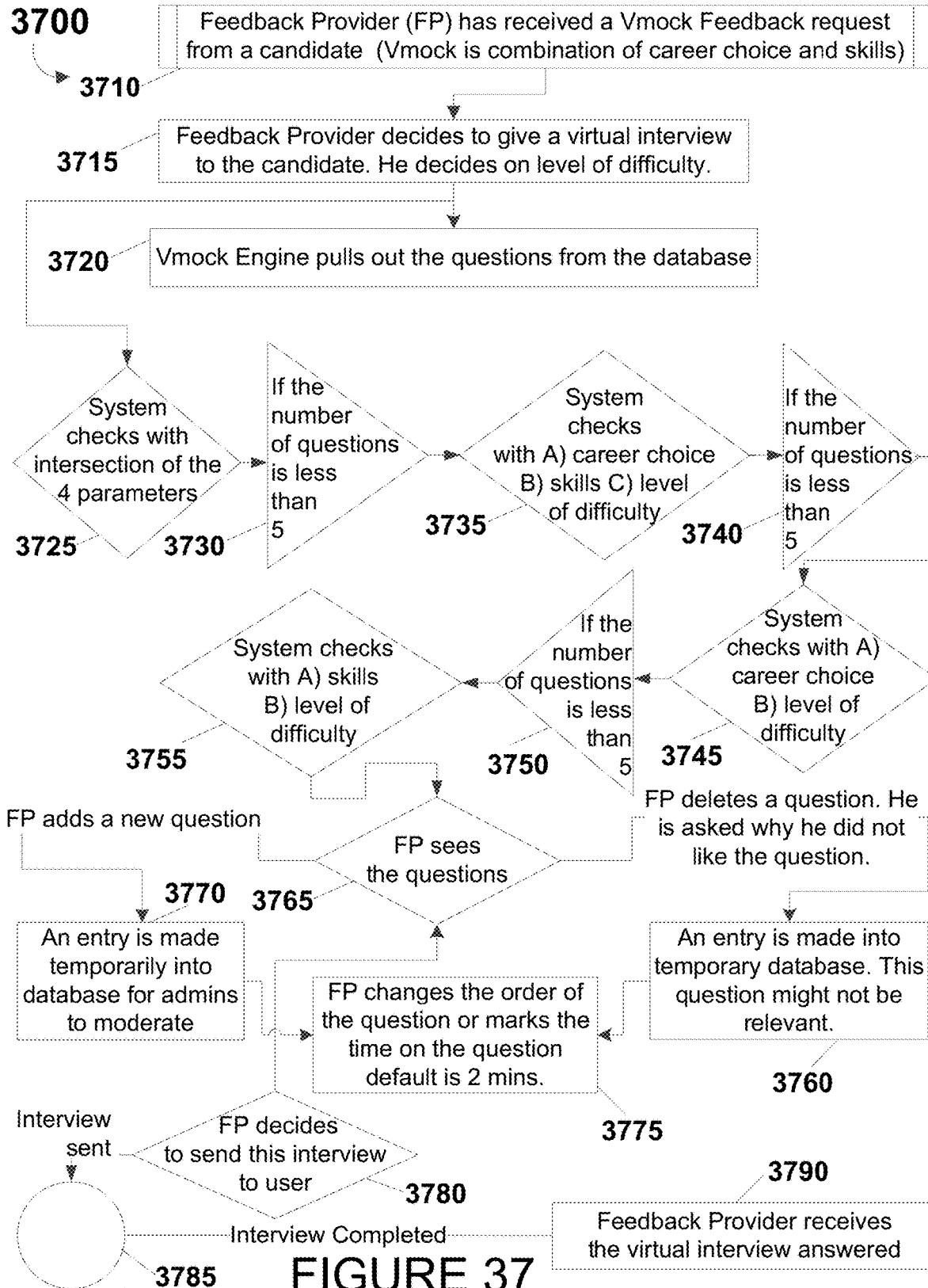
FIG. 37 is the chart showing feedback provider virtual (mock) interview.

FIG. 37 describes the interview process where the feedback provider provides the Mock interview to the candidates. These interviews are based on feedback provider background and the areas of feedback that he/she has selected. These can also be classified as Round1 and Round2 interviews. (Details of the figure and description are mentioned below).

Figure 38:
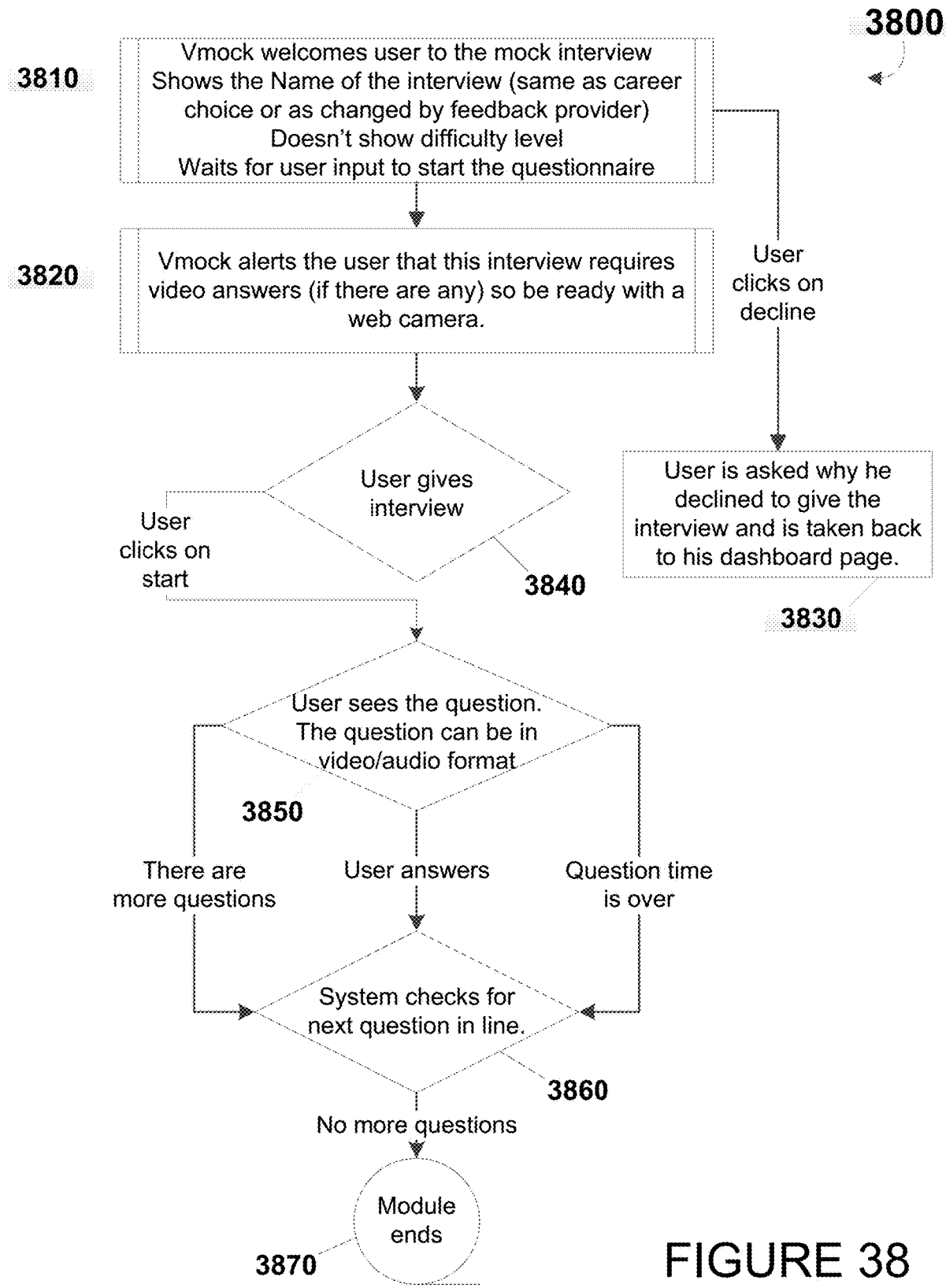
FIG. 38 is the flowchart that shows candidate taking virtual (mock) interview.

FIG. 38 describes the interview process where a candidate conducts an interview that is provided by the company in a simulated environment. (Details of the figure and description are mentioned below).

Once the candidate has completed the interview, he/she can review (945) and rerecord responses to questions that he did not do so in step (935). If the candidate is satisfied with (950) and has completed his/her interview, he can begin the request feedback process (605).

l. Conduct Virtual Interviews Delivered by Companies (1000)

The VMock platform also provides the capability for the candidate to conduct interviews from companies or headhunting firms. FIG. 10 illustrates this process. The candidate begins this process in step (1010). He/she reviews any interview request received (1020) in an e-mail/text format and if is interested in the opportunity accepts to do the interview (1040) by responding to the communication and sending an acceptance request. Along with the interview request, a package of value-added content will be delivered into the candidate's inbox for review and preparation. The package includes information about the company, and informational resources to help the candidate prepare for the interview that the company typically provides to candidates that interview with them. In the next step (1050), the candidate starts the selected interview, and records responses to questions (1060). Once the candidate has finished the interview, he/she submits and delivers the interview to the company (1070) via the VMock platform. The interview can be a combination of the audio, video, text, document responses packaged in the form of a VMock.

m. Prepare DigitalResume and Apply (1100)

Figure 11:
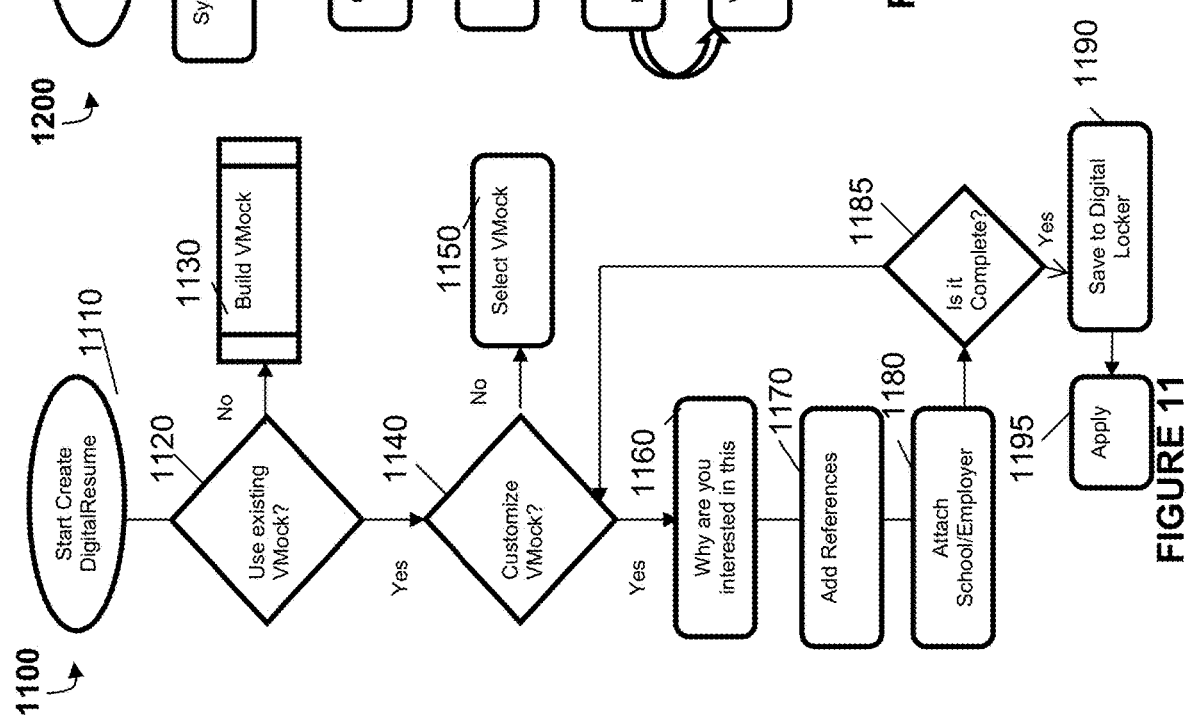
FIG. 11 is the flowchart where candidate will use her VMock as an interview in the form of DigitalResume.

The VMock platform also provides the capability for a candidate to create a DigitalResume i.e. a customized VMock for that company/opportunity. A DigitalResume includes a VMock and answer to question "why interested in the company", "why interested in the position and opportunity" and any references. FIG. 11 illustrates this process. The candidate begins the start create DigitalResume process in step (1110). In the next step (1120), the candidate decided whether or not to use an existing VMock. If yes, in the next step (1140), the candidate customizes the VMock by the next steps (1160), (1170) and (1180) where the candidate answers the question "Why this company, position and opportunity?" adds references and updates schools and employer profiles. References are received using VMock platform and can be text, audio, video or a. The candidate updates the school and company profiles for providing the ease to companies so that they don't have to do research about the same, especially if these are relatively unknown. In the next step, (1185) if the DigitalResume is complete, the candidate saves the DigitalResume to the DigitalLocker in step (1190) and applies to the opportunity in step (1195) else the candidate customizes the resume further and repeats the process.

n. Candidate SoftScore (1200)

The VMock platform will generate for each candidate their unique numeric SoftScore which will have detailed scores for each skill and comments provided by others. The SoftScore will be based on an algorithm that will incorporate the candidates own self-assessment of their core soft skills, ratings from feedback providers, recruiters and any other parties providing feedback. In step (1210), the candidate begins the SoftScore process. In step (1220), candidate is presented with 5 fundamental soft skills (Teamwork, Leadership, Communication, Commitment and Attitude). In step (1230), the candidate completes a self-evaluation process by assigning himself/herself a baseline score based on the proficiency level in each area and the VMock system generates a base quantitative SoftScore for the candidate in step (1240). When the candidate receives feedback in step (1250), in the next step (1260) the system calculates a new SoftScore based on the quantitative score assigned to the candidate by the feedback provider on skill(s) individually or as part of entire VMock. In this manner the SoftScore will be dynamic and as such will adjust through the skills development lifecycle of the candidate. Basically, every candidate will assign a self evaluation driven score along 5 fundamental soft skills and every time a feedback is received on one or more of these 5 skills, the quantitative score will keep getting adjusted to provide the recent SoftScore. The weights on each skill will vary based on various professional levels like entry level, middle management, senior leadership, executives etc and career choices like investment management, consulting, brand management etc. SoftScore can be used by the candidate to publish their soft skills and employers to seek candidates with target scores.

II. Feedback Provider Process Flow:

Feedback Provider leverages his/her background to provide feedback to a candidate at VMock. He/she does so due to many possible motivations including but not limited to networking, alumni gift, charity contribution and financial incentives. The system provides the feedback provider with the platform to provide feedback to candidates. VMock provides a central electronic storage and viewing platform for the feedback provider to maintain all of his/her information related to the feedback process. To begin with, the feedback provider may build and create his/her standard profile, allocate time slots, select areas of feedback from his/her background and set access rights for what is public and private to candidates searching for feedback providers. Most importantly, the present invention allows the feedback provider to view candidate's VMock, provide feedback using VMock provided feedback templates or customize these feedback templates and upload the same by the feedback provider and finally send the feedback to the candidate with analysis and suggested improvements. The platform further allows VMock feedback providers to set rates, join groups and communities, accept and deny candidate requests and manage any content that they would like to make available to others on VMock. Before a feedback provider can decide to provide feedback in certain areas, they are asked simple questions about recommended skills for those areas i.e. recommended skills for an analyst role in management consulting or for a specific company. This helps VMock in updating and maintaining the skills match database mentioned in the search process.

The system of the present invention manages the feedback provider registration and feedback process to candidates in the following steps:

1300 Feedback provider registration
1400 Profile Creation
1500 Areas of Feedback
1600 Inbound Feedback Requests
1700 Review and Provide Feedback
1800 Create Customized Feedback Forms
1900 Review Ratings and Testimonials
2000 Upload Documents/Videos
2100 Interview Management Dashboard
2200 Communities and Blogs
2300 Offline Request
2400 Alumni Referrals Program
2500 Corporate Feedback Provider Process Each of these and the other aspects are discussed in further detail herein.

A. Feedback Provider Registration Process (1300)

Figure 13:
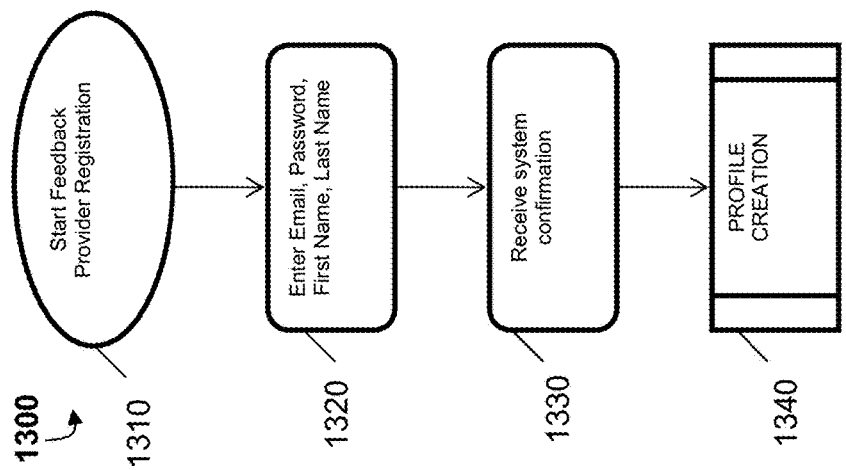
FIG. 13 is the flowchart for Feedback Provider registration.
Figure 12:
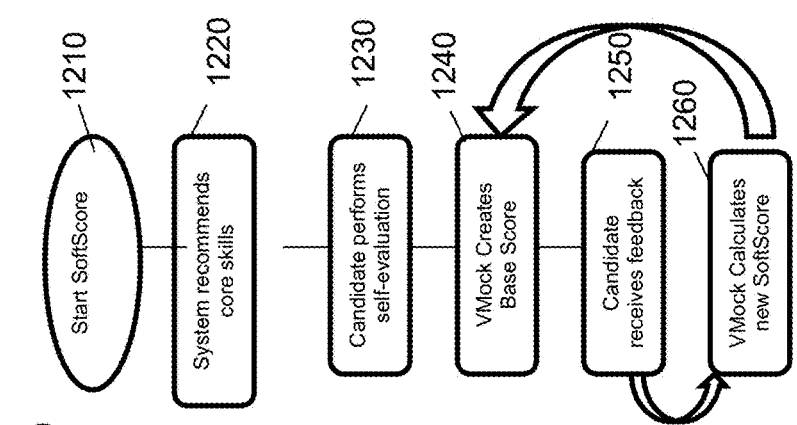
FIG. 12 is the flowchart that shows how VMock system calculates candidate SoftScore and adjusts the same dynamically.

In a preferred embodiment, before the feedback provider can utilize the services and features of the system of the present invention, the feedback provider must first register with the system. FIG. 13 is a flow chart illustrating the general registration process for a new feedback provider to the system. In step (1310), the feedback provider begins the registration process via the VMock platform. In step (1320), the feedback provider enters his/her Name and e-mail address and selects a password. The system sends a confirmation e-mail to their e-mail address, after which the candidate logs back into the system and moves on to the Profile Creation process (1340).

B. Profile Creation Process (1400)

Upon registration, the feedback provider begins to create his/her profile in step (1410). The feedback provider enters via provided text input areas his education, professional work experience and personal contact and background information in step (1420). He/She also assigns privacy settings on what information will be public and what will be private and also what type of feedback provider he/she is i.e. corporate, individual, career services staff, recruiter, current student, etc. This information will be displayed to the candidate once he/she is looking for the feedback provider. This will help the candidate to select the right type of provider as needed during their career development lifecycle for example they may not wish to contact a recruiter until they are completely comfortable with their VMock and are ready for interviewing.

In step, (1430) VMock uses a third-party provider to conduct a background check on the feedback provider.

Based on all the personal, professional and background information entered by the feedback provider, the third-party conducts the background check. After the background has been checked in step (1430) and if it goes successful, the feedback provider is sent an e-mail to be welcomed to VMock in step (1440). In step (1450), the feedback provider then moves on to the next process of selecting areas of feedback. If the background check is unsuccessful, the feedback provider is sent an e-mail telling him/her that the background check did not go through so he/she cannot become a VMock feedback provider and the systems stores the information about the person and why their background check did not go through.

C. Areas of Feedback Selection (1500)

Once the feedback provider has created their profile, they move on to selecting their areas of feedback in step (1510). In step (1520), the feedback provider selects potential areas that they will provide from a list created from their background information, skills and competencies. In step (1530), the feedback provider assigns feedback utilities including Rounds of Interviews, Suggested skills by areas of feedback, Long-term Coaching, Referral, Corporate Sponsorships, Offline Follow-up etc. For example, if a feedback provider chooses management consulting as an area of feedback, they will enter top-3 skills recommended for that career according to their experience. Every feedback provider is allowed to provide feedback on the basis of their educational and professional background only. So, if a candidate did not work for pharmaceutical industry, VMock system does not allow them to provide feedback in that area. Besides the background every feedback provider can add their top-3 soft and top-3 hard skills to provide feedback on. Optionally, feedback provider can decide to be a mentor or not. VMock will also host feedback providers sponsored by the company i.e. corporate sponsorship and select feedback providers will have relationships with their companies whereby company will pay them for every successful referral of a candidate, just like a head hunter. In step (1540), the feedback provider moves on to managing his/her calendar on a weekly/monthly basis and make certain number of hours available for free/$ or decide to pledge the money to non-profit of choice. A feedback provider can decide to be anonymous and also not reveal his/her fee to the public.

D. Inbound Feedback Requests (1600)

After the feedback provider has selected his areas of feedback and assigned utilities, he/she will now be searchable by candidates looking for feedback. In step (1610), the feedback provider can begin to view any feedback request he/she has received. In step (1620), the feedback provider goes through requests he has not responded and can choose to accept or decline to provide feedback to the candidate. In step (1630), if the candidates request is accepted by the feedback provider, the feedback provider moves to step (1640) and begins the process to review and provide feedback. If the feedback provider chooses not to provide feedback, in step (1630) the candidate is sent a communication declining their request.

E. Review and Provide Feedback (1700)

Upon accepting the candidates feedback request, in step (1710) the feedback provider begins the process of reviewing candidates VMock. In step (1720), the feedback provider goes through the candidates VMock and begins to view each and every video, text, document submitted in the candidates VMock. In step (1730), the feedback provider selects the form he/she will use to provide the feedback from a list of VMock or his/her own customized forms. In step (1740), the feedback provider enters his feedback in text, audio or video format. The feedback provider repeats this process for each VMock that the candidate has sent to him/her.

After the feedback provider enters the feedback, he/she sends the feedback to the candidate in step (1750). After sending the feedback, the feedback provider receives his payment if he is doing this as a paid service in step (1760).

F. Create Feedback Form (1800)

To create customized feedback forms, the feedback provider can use the create feedback form process in step (1810). The feedback provider begins to do so by first selecting the mandatory categories from VMock in step (1820). Then in step (1830), the feedback provider then adds his/her own categories, rating areas, etc. In step (1840), the feedback provider reviews the form and uploads it on to the site and finally in step (1850), the feedback provider names and saves the form for future use.

G. Review Ratings and Testimonials (1900)

Figure 19:
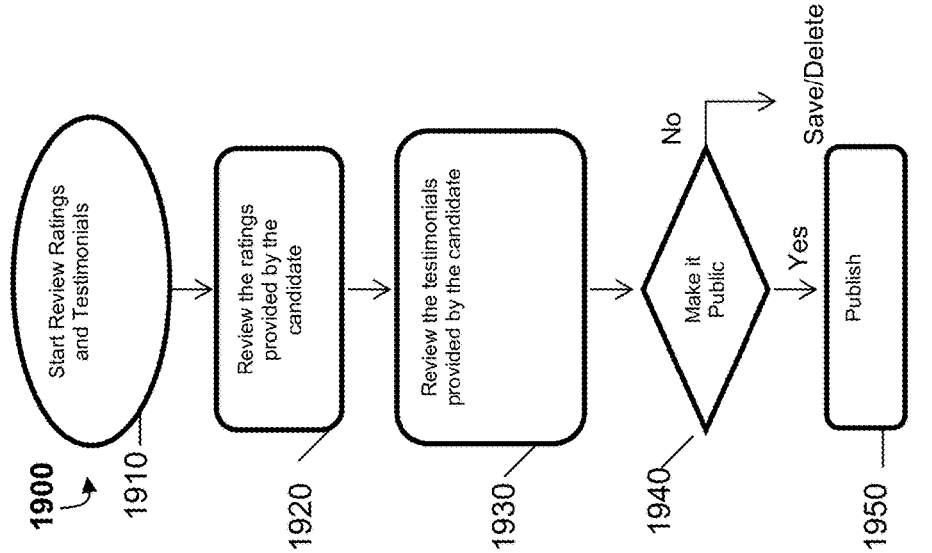
FIG. 19 is the flowchart that describes feedback provider reviewing the ratings and testimonials.
Figure 18:
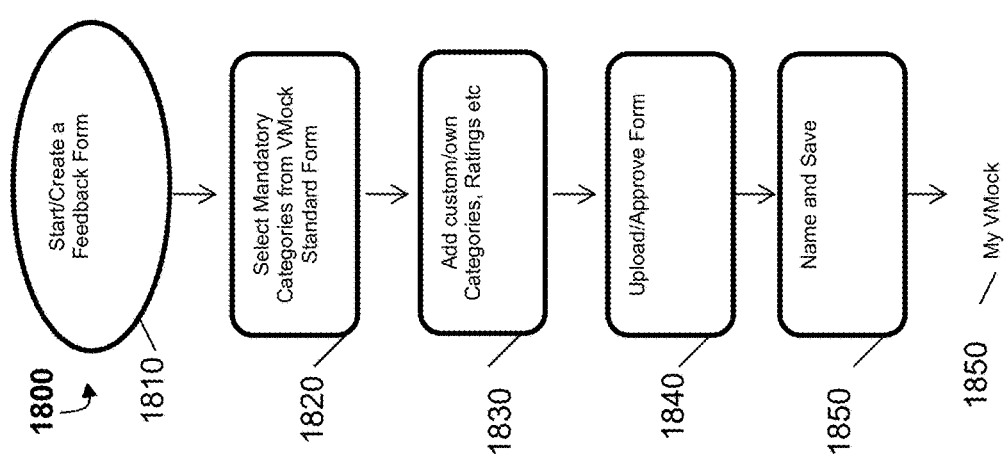
FIG. 18 is the flowchart that shows that feedback provider is creating his customized form.
Figure 17:
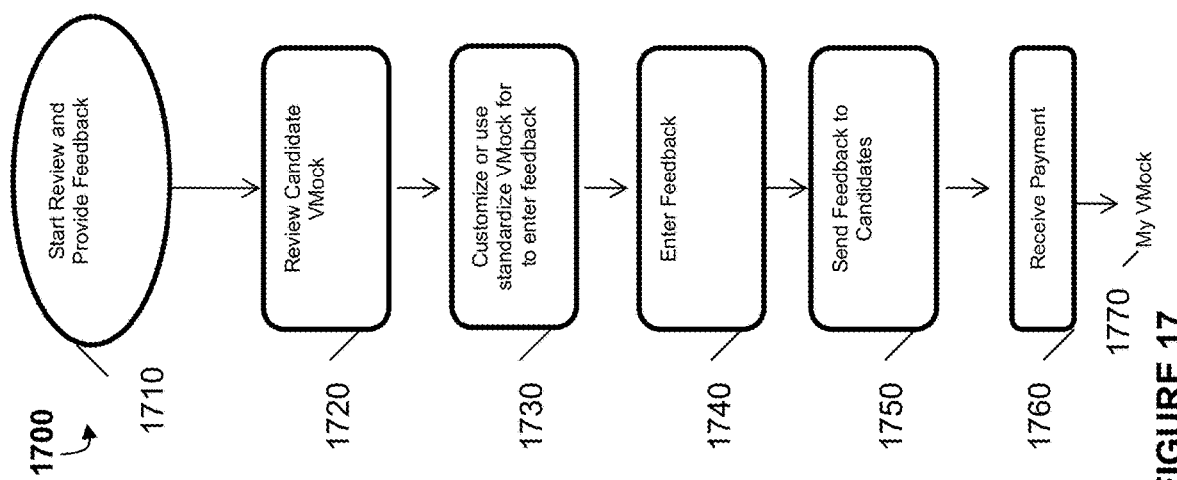
FIG. 17 is the flowchart where feedback provider reviews and provides feedback.
Figure 33:
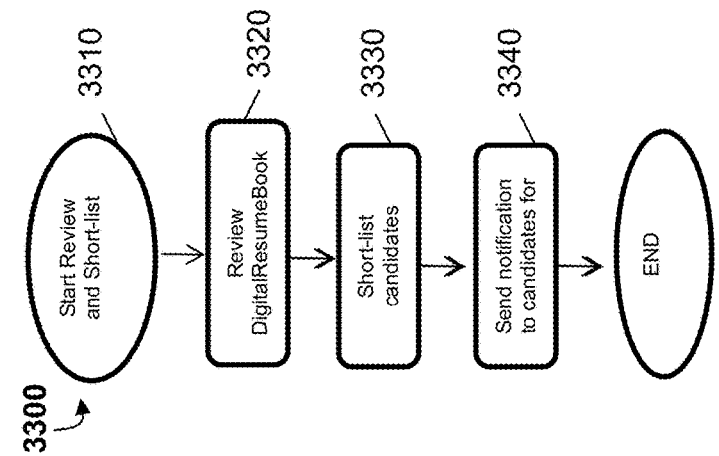
FIG. 33 is the chart showing company review and short listing of candidates.
Figure 32:
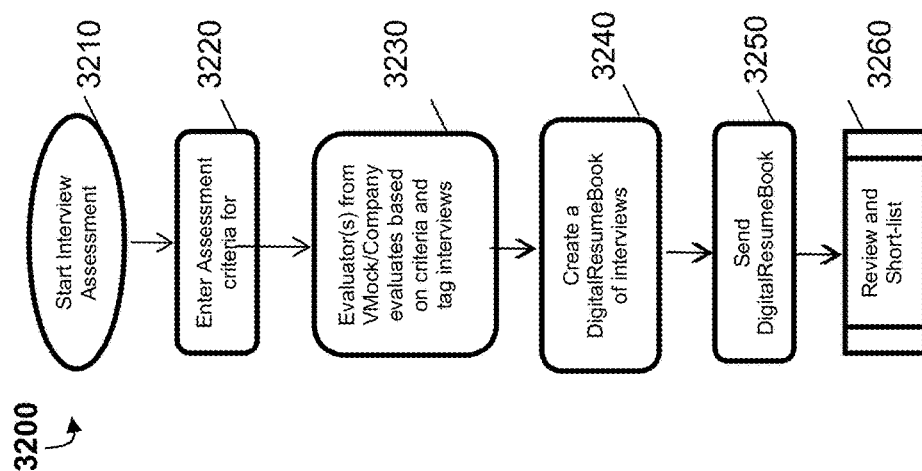
FIG. 32 is the chart showing company interview assessment process.

FIG. 19 depicts the flow-chart of the Review ratings and Testimonials process. In step (1910), the feedback provider begins to review ratings and testimonials by candidates. In step (1920), the feedback provider reviews ratings provided by candidates, and in step (1930), the feedback provider reviews testimonials given by candidates. Upon review of testimonials, in step (1940) the feedback provider can choose to either make the testimonial public or not. If he/she agrees to make the testimonial public, he can publish it in step (1940). Else the testimonial will get deleted or stored privately.

H. Upload Documents/Videos (2000)

FIG. 20 shows the flow chart of the upload documents/videos. In step (2010), the feedback provider begins the process of uploading documents and videos that he/she thinks will be relevant and helpful to candidates. These uploads can be made available publicly via the feedback provider's page, blog or community pages. In step (2020), the feedback provider creates and uploads documents. In step (2030), the feedback provider creates and uploads videos. Upon uploading documents and videos, in step (2040) the feedback provider assigns categories to all uploads. These documents can be packaged as e-learning modules on the VMock for the benefit of candidates. These e-learning modules can be searchable independently as well and can be marketed on the VMock platform as well.

I. Interview Management Dashboard (2100)

One of the services that feedback providers can provide is customized interviews for the company that they are providing feedback for. Candidates can conduct these interviews in a timed manner and send it back to the feedback provider for feedback and review. FIG. 21 describes this process. In step (2110), the feedback provider starts the interview management dashboard, which includes access to VMock interview questions database, capability to transfer questions to the candidate interview box, and add specific questions as feedback provider finds appropriate because VMock database may not have all necessary role specific hard skill questions e.g. example of the candidate skills in the area of mergers and acquisitions. In step (2120), the feedback provider creates and uploads customized interviews. These interviews can be created using VMock's interview questions, as well as new questions added by the feedback provider. Then in step (2130), the feedback provider selects the candidate to send the interview to, followed by step (2140) where the feedback provider finally sends the interview to the candidate. The interview can be in text, audio or video formats. Feedback provider can save these customized interviews for future reference.

J. Communities and Blogs (2200)—VMock will provide its feedback providers the capability to create various communities around their backgrounds and interests. They will be able to create blogs on the site which will help them create value-added content for the candidate community. Upcoming events at various locations, career fairs, job trends, salary trends, latest news on various companies etc will become various discussion topics.

K. Offline Requests (2300)

One of the services that feedback providers can provide is offline contact. FIG. 23 describes this process. In step (2310), the feedback provider begins the offline request process. In step (2320), the feedback provider reviews requests from candidates for offline requests. In step (2330), the feedback provider decides whether or not to provide an offline contact with the candidate. If the feedback provider agrees, an acceptance e-mail is sent to the candidate, else, the feedback provider sends a decline e-mail to the candidate (2340).

L. Alumni Referral Program (2400)

An alumni referee is an ex-employee of a company who is interested in referring candidates for hiring with his/her ex-employer and who has been accepted to do so by his/her ex-employer. Alumni referral program is meant to leverage relationships that companies have with their alumni towards hiring candidates. In step (2415) feedback provider signs-up to be alumni referee. The feedback that alumni referee will give to a candidate can be evaluative in nature. Alumni referee are allowed to make searches on the database for public VMocks and can proactively connect with a candidate for an available position like a headhunter. In step (2420) feedback provider selects schools and companies that he/she is interested in being the alumni referee, in step (2425) he/she is approved (or rejected) by the company/school as their referee. Step (2430) he/she searches available positions and sends those to candidates, Step (2435) candidate decided if he/she is interested in the position, in step (2440) candidate applies via VMock and tags the feedback provider as referee. In step (2445) feedback provider gets a confirmation from candidate, VMock system and finally from the company that the profile has been received. In step (2450), if the candidate is successfully recruited by the company, referee gets paid (2460) or else sent a thank you letter (2455) by the company.

M. Corporate Feedback Provider (2500)

Corporate feedback provider joins VMock to identify suitable talent early and also be involved in candidate career development. This service is set up so that companies can designate certain employees as feedback providers who will provide feedback to interested candidates for free. FIG. 25 describes this process. In step (2520), an employee signs up as a corporate feedback provider, in step (2530) he/she defines a set of questions to be answered by the candidate which is the criteria that the company considers a prerequisite (these would be very company specific and the company gets the chance to define these in the system) to be eligible for receiving feedback, in step (2535), he/she defines other constraints i.e. number of available hours per week, office preferences etc and in Step (2540) he/she provides feedback in the same way that any feedback provider in the system would provide feedback as described in method (1700) and recommend for the interview (2550).

III. Company Process Flow

The VMock platform also provides a connection between companies, candidates as well as schools to enable virtual recruiting. Companies can register onto the platform to utilize service offerings, deliver interviews to candidates at schools where they may or may not maintain a physical recruiting presence.

The system of the present invention manages the company registration and enables the following processes:
2600 Company registration and login process
2700 Create Profile (DigitalFolio)
2800 Selection of Positions process
2900 Selection of Schools process
3000 Pre-selection criteria for Schools process
3100 Deliver Interviews process
3200 Interview Assessment process
3300 Review and Short-list process
3400 Payment Process A. Company Registration and Login Process (2600)

Before companies can begin using the services provided by the VMock platform they have to register with the system. As shown in FIG. 26, the companies begin the registration process in step (2610). The company enters a username and password (2620) and awaits confirmation (2630). If the company has supplied all necessary information including size, location, web site URL (Uniform Resource Locator) etc then they are sent a welcome communication (2640) else they are taken back to the beginning to reenter or can exit the system.

Once the company receives the welcome communication, it can now select the range of services it would like to avail from VMock (2650) e.g. virtual interviewing at schools, posting virtual interviews for public access, searching of candidate database, VMock HR services including $3^{rd}$ party screening etc. After selecting the range of services, the company makes a payment to VMock (2660) and can now begin its profile (DigitalFolio) creation in step (2670).

B. Create Profile (DigitalFolio) (2700)

DigitalFolio is a corporate recruiting profile meant to provide all necessary career related information about a company in one location. Essentially, it is a corporate resume meant to attract candidates. Company cerates its DigitalFolio in this step (2710) by building generic recruiting, corporate and industry information about the company in step (2720) and then entering job descriptions, day-in-the-life videos, sample articles, reports, product descriptions etc in step (2730) and then finally completing a unique page for each visiting schools and major location by providing school/location specific information i.e. alumni from that school/location, recruiting dates and calendars for that school in step (2740) and can now begin the process of selection of position (2750).

C. Selection of Positions (2800)

Once a company has registered with VMock, it now enters the selection of positions process described in FIG. 28. The company begins this process in step (2810). In the next step the company enters the positions it would like to recruit for (2820) via a text input field provided in the process, and follows by entering the relevant job description in step (2830) by either pasting from an existing document on their local machine or creating one from scratch on the VMock system using text input fields. Once the company has completed this process by entering all the information, it moves into the next process of selecting schools where it would like to recruit for these positions (2840). VMock will provide a list of schools that it has relationships with and the company can select from that list. If the company wants to recruit from a school not listed on the VMock system then they are given the option of contacting VMock with a request in the form of an e-mail or they can also call a provided phone number.

D. Selection of Schools (2900)

After the company enters the positions it would like to recruit, for it enters the process for selecting the schools as illustrated in FIG. 29. In step (2910) the company begins this process and in the next step (2920), it selects the schools it would like to recruit at for these positions and submits the list for approval to VMock (2930) to ensure there is no conflict of interest with the schools chosen by the company and VMock. Once the company receives confirmation (2940), it moves into the next process of pre-selection criteria for invitation (2950). The criteria will be company and position specific and can include number of years of work experience, specific soft skills (required, critical or important), GPA, technical expertise, majors, etc which can be used to filter candidates. For example a consulting firm visiting school x specifies 4 requirements 1) Major in strategy or finance 2) Minimum GPA of 3.5 3) 3 years of work experience 4) authorization to work in the US 5) Interest in consulting and the company.

E. Pre-Selection Criteria for Schools (3000)

As part of the recruiting process, companies will specify interview criteria (3010) as mentioned above for schools where they want to recruit for the particular positions. In step (3020), the company enters quantitative criteria for candidate selection such as GPA, number of years of work experience, etc. Once target school reviews and confirms the criteria (3030), the company can receive pre-selected resumes (3040) from the schools it chose earlier. The resumes are of those candidates from the selected schools who meet the criteria specified by the company. The company will use this list of candidates to short list a group of candidates that it wishes to virtually interview. The company sends the invite to selected candidates for the next step interviews the interview logistics as well (3050). The company can now conduct the delivery of interviews to the candidates in the deliver interview process (3060).

F. Deliver Interview (3100)

Figure 31:
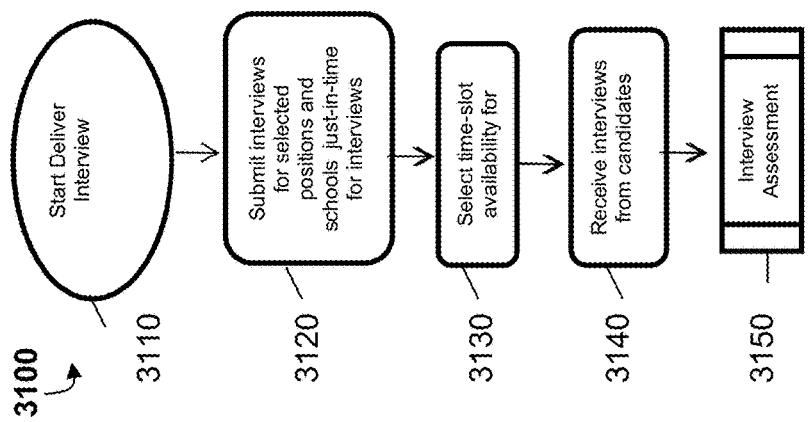
FIG. 31 is the chart where company delivers interviews to candidate.

The VMock platform allows companies to deliver virtual interviews to selected candidates. The method for doing so is via the VMock platform, where candidates can interview at specified locations with VMock technology or using their own computer connected to the Internet on the VMock platform. FIG. 31 illustrates this process. In step (3110), the company begins the deliver interview process. In the next step, (3120) the company submits interviews for the selected positions and schools. The interviews follow a similar format to those in the VMock system and consist of a list of questions that the candidate is expected to answer, the questions can be in the form of text, video or audio. The company then selects time slots when it would like candidates to perform the interviews (3130) using a calendar utility provided by VMock that is similar to calendar utilities available in most platforms, outlook, gmail, etc. The candidates can now go online and perform the interviews according to the specified logistics and instructions. For example, interview logistics could state that on a specific date from 10 AM to 11 AM candidates can enter the system and perform the interview. Once candidates complete the interviews, the interviews are stored into the VMock platform and can now be reviewed by the company (3140) and the company can begin the interview assessment process (3150).

G. Interview Assessment (3200)

Once candidates have completed the interviews the company can begin the assessment process for those interviews (3210). The next step is for the company to enter the assessment criteria (3220) for evaluating the candidate. The assessment criteria are similar to the selection criteria specified by the company for that position. These could be based on the internal assessment form that the company typically uses to interview candidates in person during their typical recruiting process such as communication, presence, knowledge, aptitude, etc. In the next step (3230), evaluators from VMock, company or 3$^{rd}$ party will evaluate the candidate based on the specified criteria and tag the interview accordingly. Once the interviews have been evaluated, in the next step a DigitalResumeBook of selected interviews is created (3240). VMock DigitalResumeBook is a link which has selected tagged interviews embedded in it. Once this link is clicked a table with list of all interviews and their assessments opens up, and company can click any particular interview to view the details. If candidate interviews are tagged by VMock or some 3$^{rd}$ party, the DigitalResumeBook is then sent to the company (3250) with recommendations which then begins the review and short-list process (3260).

In a separate process, when a candidate applies to a company for a specific position posted on VMock by the company using their DigitalResume, the company gets his/her standard resume with two additional action buttons i.e. "interested" and "not interested". Also, the resume carries a link to candidate DigitalResume, which only gets active once the company decides that they have interest in the candidate based on his/her resume.

H. Review and Short-List (3300)

Once the company receives the DigitalResumeBook, it begins to review and short-list candidates (3310). The short-list process involves reviewing of virtual interviews of candidates via DigitalResumeBook and deciding on candidates that will move to the next step in the recruiting process. The company reviews the DigitalResumeBook that contains the virtual interviews (3320). In the next step, the company short-lists candidates (3330) and sends them a notification for second round interviews (3340) or if convinced can extend an offer to a candidate as well. During the review of the candidate DigitalResume, different folks inside a company look at specific pieces of the DigitalResume and mark their comments; they can also review comments from others upon submitting their comments. Once everyone submits their comments, they all get together and make a decision on the candidate.

Start Payment Process (3400)

Figure 34:
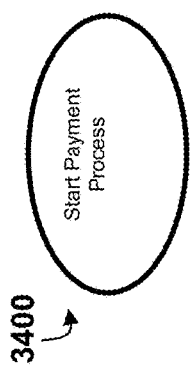
FIG. 34 is the chart showing company payment process.

FIG. 34 represents the payment process. This process will be similar to current processes used in online payment systems. Companies will be able to use credit card, bank account or paypal online payment to pay for services provided by VMock.

J. VMock Interview Engine (3500)

FIG. 35 describes the VMock interview engine. The interview engine is a core element of the VMock platform and is used by candidates (3515) to conduct interviews, by feedback providers (3530) and companies (3510) to create interviews for candidates.

The interview engine's output is an interview (3575). The engine (3550) consists of two core elements A—the skills match database and B—the VMock Interview Questions database. The skills match database matches skills to career choices and the VMock interview questions database segments and characterizes questions based on skills, order of difficulty and career choice. It is the intersection of these two databases that provides the platform for the interviews. Interviews follow the format as laid out in 3570 as follows— each interview begins with a question with the intention "tell me about yourself?", followed by "why are you interested in this particular career", next "why you are interested in a particular company" (if relevant). This is followed by questions that test specific skills that are of importance to a particular career choice and position. These questions are ranked high, medium or low based on order of difficulty and importance to the career choice. The next question can be questions the candidate wants to ask the recruiter followed by thank you. Often a random question can be integrated with the interview based on its order of difficulty.

The order of difficulty for questions is something that is dynamically determined by the VMock system. The initial order of difficulty is set by the VMock platform and is based on input from experts and HR professionals. As the questions database gets used candidates, feedback providers and companies are asked at each point of usage to rate the difficulty level of the question and the rating is determined by this user input.

As mentioned above, candidates use the interview engine to interview both by career choice (3520) such as consulting as well as by skills that they choose (3525) such as leadership, teamwork, etc. In addition they can select the order of difficulty and number of questions. FIG. 36 details the candidate flow in using the interview engine in detail.

Feedback providers use the interview engine to select questions for their custom interviews and can also add/create additional questions to be included in the interview (3560). The feedback provider can also specify time limits, ability to re-record, and order of priority (3580). FIG. 37 details the feedback provider process for creating interviews.

Similar to the feedback provider, Companies (3510) use the VMock interview engine to create customized interviews that they want to deliver to candidates. If desired, the company can use the VMock interview engine (3550) in conjunction with their internal corporate interview questions database (3535), and new questions that they create (3540). The company can also set time limits, ability to re-record and order of priority (3565). FIG. 38 details the process on how candidates conduct interviews delivered by companies.

K. Candidate Self Virtual Mock Interview (3600)

FIG. 36 describes the interview process for candidate using the VMock Interview engine. The candidate selects a VMock career choice, or/and skills or/and target company that he/she wishes to conduct the interview for (3610). Next, the candidate chooses the level of difficulty for the interview (3620) ranging from low to high. Based on this information the VMock engine pulls interview questions from the database of questions residing in the platform (3630). In the next step, the system checks for the questions that satisfy the intersection of the career choice, skills, target company and order of difficulty to create a customized interview for the candidate (3640). In 3650, the system checks if the number of questions is less than 5, if so the system then checks for intersection of three parameters and iterates this process reducing the parameters in steps 3660, 3665, 3675 and 3680 to generate an interview with at least five questions that the candidate can conduct. In step 3685, the candidate decides whether or not to conduct the mock interview based on the criteria satisfied, and if so conducts the interview (3690). Once the interview is complete the candidate saves his/her interview in his/her digital locker and can obtain feedback on this in the future.

L. Feedback Provider Virtual Mock Interview (3700)

FIG. 37 describes the interview process where the feedback provider provides the Mock interview to the candidates. The process begins in step 3710 when the feedback provider receives an interview request from a candidate that includes the career choice and skills of interest to the candidate. In step 3715, the feedback provider decides on the level of difficulty for the interview. Next, the feedback provider begins selecting interview questions from the VMock questions database. The database generates the list of questions that can go into the interview in the same process as described above in FIG. 36. However, in this method 3700 the feedback provider can delete questions that he/she does not like and an entry is made into the VMock system that stores that history for use in the future (3760). The intention is that if a particular question is constantly not being used it may not be a very relevant question for an interview that meets the career choice, skills, company or order of difficulty intersection. The feedback provider in the next step 3770 adds his/her own questions to the list of questions and sets particular time limit for response (3775). In step 3780, the feedback provider reviews the interview and decides whether or not to send the interview. Once he/she decides to send the interview (3785) it is sent to the candidate who completes it and the feedback provider receives the interview and can review it (3790). If the feedback provider decides not to send this interview, he/she repeats the process starting at 3710.

M. Candidate (Taking) Company Virtual Mock Interview (3800)

FIG. 38 describes the interview process where a candidate conducts an interview that is provided by the company. Process 3800 lays out the steps that incorporate this from the candidate perspective. The candidate is welcomed to the interview and is shown descriptive information of the particular interview (3810). The candidate is prompted to click a button when he/she is ready to begin the interview (3810). The candidate can also decline to do the interview here and exits the system. The candidate is alerted that this interview is video-based and is asked to ensure that webcam is ready (3820). Once the candidate is ready he/she clicks on starts and sees the question (3850). The candidate answers the question in the specified time limit (3860) and continues this process until there are no more questions and the interview is considered complete (3870).

N. Search Engine (3900)

Figure 39:
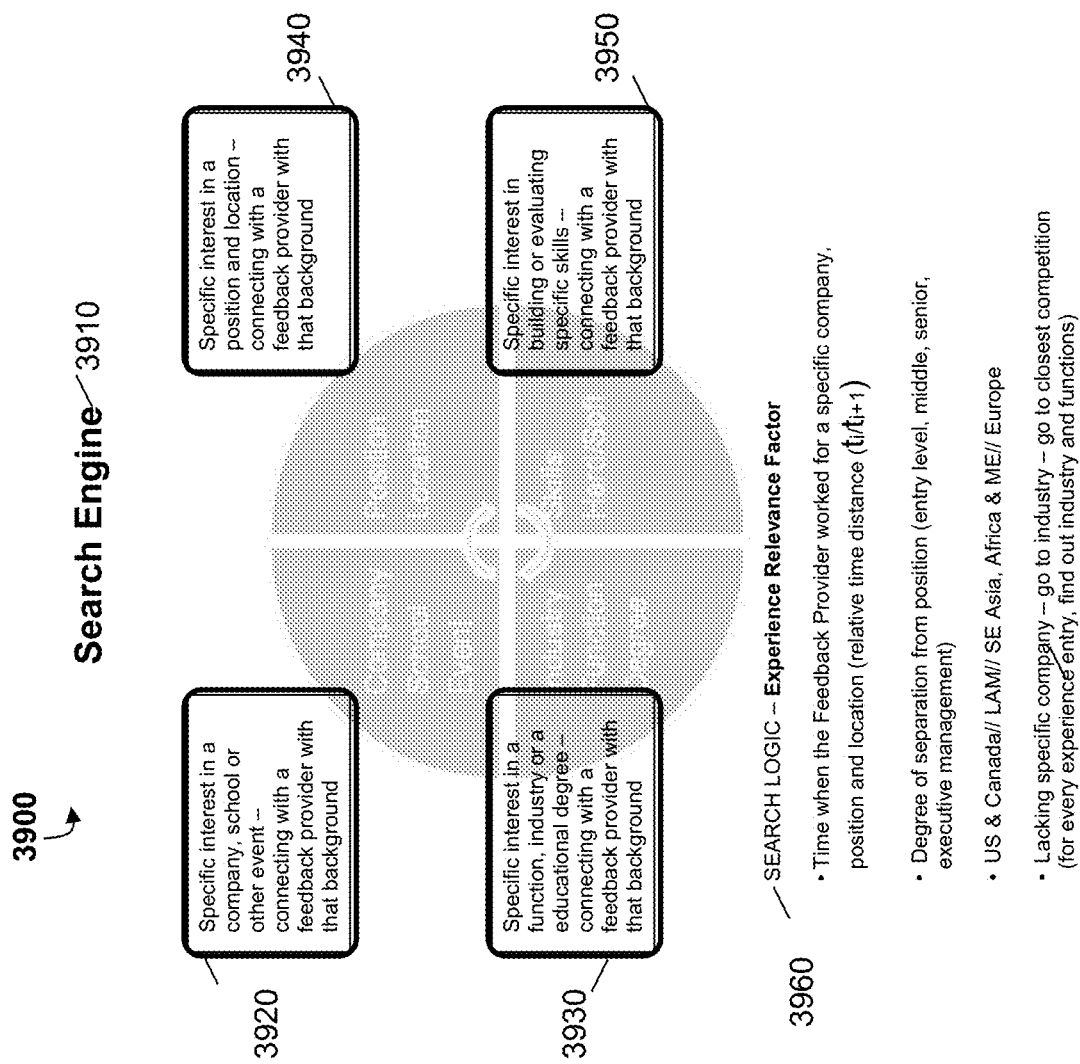
FIG. 39 is the flowchart that shows the search engine rationale and algorithm.

FIG. 39 describes the logic used in the search for feedback providers by the candidates. The feedback provider can be searched for in the following four ways:

(3920) Based on specific interest in a company, school or other event that involves connecting to a feedback provider with background.

(3930) Based on specific interest in a function, industry or an educational degree that involves connecting to a feedback provider with that background.

(3940) Based on specific interest in a position and location that involves connecting with a feedback provider with that background.

(3950) Based on specific interest in building or evaluating specific skills that connecting with a feedback provider with that background.

The search logic is based on an experience relevance factor which includes time (based on when the feedback provider worked for a specific company), degree of separation from position (entry level, middle management, senior and executive management), location. The logic defaults to the industry or closest competition if a particular company is not available.

O. An Example Computing Device (4000)

Figure 40:
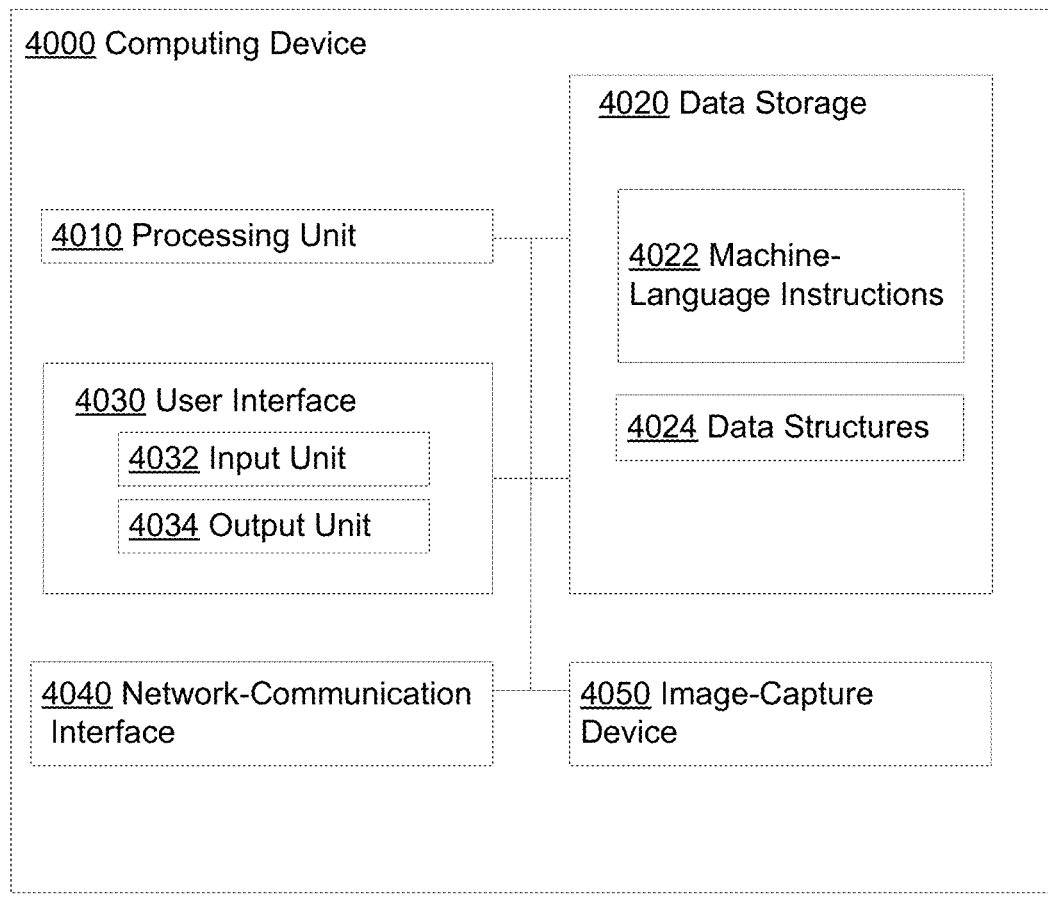
FIG. 40 is a block diagram of an example computing device, in accordance with embodiments of the invention.

FIG. 40 is a block diagram of an example computing device 4000, comprising a processing unit 4010, data storage 4020, a user interface 4030, a network-communication interface 4040, an image-capture device 4050, in accordance with embodiments of the invention. A computing device 4000 may be a desktop computer, laptop or notebook computer, personal data assistant (PDA), mobile phone, embedded processor, or any similar device that is equipped with a processing unit capable of executing machine-language instructions that implement at least part of any or all of the herein described methods, methods as depicted in FIGS. 1 through 34, described functionality of a VMock Platform, a Web Server, a Media Server, a Database Server, and/or a Search Engine.

The processing unit 4010 may include one or more central processing units, computer processors, mobile processors, digital signal processors (DSPs), application-specific integrated circuits (ASICs), graphics processing units (GPUs), microprocessors, computer chips, integrated circuits, and similar processing units now known and later developed and may execute machine-language instructions and process data.

The data storage 4020 may comprise one or more storage devices. The data storage 4020 may include read-only memory (ROM), random access memory (RAM), removable-disk-drive memory, hard-disk memory, magnetic-tape memory, flash memory, and similar storage devices now known and later developed. The data storage 4020 may be removable and/or dedicated. As such, the data storage 4020 includes one or more tangible computer-related media configured to store some or all of the machine language instructions described herein. The data storage 4020 comprises at least enough storage capacity to contain machine-language instructions 4022 and data structures 4024.

The machine-language instructions 4022 and the data structures 4024 contained in the data storage 4020 include instructions executable by the processing unit 4010 and any storage required, respectively, to perform part or all of any of the herein described methods, methods as depicted in FIGS. 1 through 34, and/or to perform some or all of the herein-described functions of a VMock Platform, a Web Server, a Media Server, a Database Server, and/or a Search Engine. In particular, the data structures 4024 may comprise a one or more herein-described VMocks, Digital Resumes, DigitalFolios, and/or DigitalLockers.

The user interface 4030 may comprise an input unit 4032 and/or an output unit 4034. The input unit 4032 may receive user input from a user of the computing device 4000. The input unit 4032 may comprise a keyboard, a keypad, a touch screen, a computer mouse, a track ball, a joystick, and/or other similar devices, now known or later developed, capable of receiving user input from a user of the computing device 4000.

The output unit 4034 may provide output to a user of the computing device 4000. The output unit 4034 may comprise a visible output device, such as one or more cathode ray tubes (CRT), liquid crystal displays (LCD), light emitting diodes (LEDs), displays using digital light processing (DLP) technology, printers, light bulbs, and/or other similar devices, now known or later developed, capable of displaying graphical, textual, and/or numerical information to a user of computing device 4000. The output unit 4034 may alternately or additionally comprise one or more aural output devices, such as a speaker, speaker jack, audio output port, audio output device, earphones, and/or other similar devices, now known or later developed, capable of conveying sound and/or audible information to a user of computing device 4000.

The network-communication interface 4040 may be configured to send and receive data over a wired-communication interface and/or a wireless-communication interface. In particular, the network-communication interface may be configured to utilize one or more network protocols to send and receive data, such as but not limited to, Internet Protocol (IP), Transmission Control Protocol (TCP), Hyper-Text Transfer Protocol (HTTP), eXtended Markup Language (XML), one or more Media Access Control (MAC) protocols, one or more Physical (PHY) protocols, and any other communication protocol, now known or to be invented, suitable for sending and/or receiving data.

The wired-communication interface, if present, may comprise a wire, cable, fiber-optic link or similar physical connection to a data network, such as a wide area network (WAN), a local area network (LAN), one or more public data networks, such as the Internet, one or more private data networks, or any combination of such networks. The wireless-communication interface, if present, may utilize an air interface, such as a wireless WAN, Wi-Fi, and/or WiMAX interface to a data network, such as a wired and/or wireless WAN, a wired and/or wireless LAN, one or more public data networks (e.g., the Internet), one or more private data networks, or any combination of public and private data networks. The network-communication interface 4040 may enable secure communications, perhaps by the use of communication-security techniques such as, but not limited to, Secure Sockets Layer (SSL), Transport Layer Security (TLS), Secure Shell (SSH), Virtual Private Network (VPN), IP Security (IPSec), Trusted Computer System Evaluation Criteria (TCSEC)/Orange Book techniques, ISO/IEC 15443, 15408 and/or 17799 techniques, public/private key techniques such as the RSA algorithm, and/or other cryptographic algorithms. The network-communication interface 4040 may connect to a data network using a wireless WAN (e.g., CDMA, TDMA, GSM, 3G, etc.), Wi-Fi, and/or WiMAX protocol.

The image-capture device 4050 may be configured to capture video images, and perhaps still images as well. The image-capture device 4050 may be a video camera, such as a digital video camera. Preferably, the video camera is configurable to capture color and/or black-and-white videos. The image-capture device 4050 may have data storage for storing captured video that is separate from data storage 4020.

The images may be stored in any suitable image file format, such as but not limited to JPEG, TIFF, RAW, GIF, Bitmap, and/or RGB (among others) for still images. The images may be stored in a video format perhaps using a video codec, such as MPEG-1, MPEG-2, MPEG-4 (Part 2 and/or Part 10) H.261, H.263, H.264, x264, VP6, VP7, Sorenson 3, Windows Media Video and/or RealVideo. Specific images may be identified in the query—for example, if a video clip is part of the query, the images may be identified numerically within the video clip (e.g., images 1 and 32 of the clip), with respect to time (e.g., the images shown at 3 seconds and 3.42 seconds into the clip) and/or as numerical or time ranges. Many image file formats and/or video formats are possible as well.

VII. Summary

Although described in the context of the Internet in the preferred embodiment, the present invention may be implemented within any number of client/server computing networks including, but not limited to, an Intranet, a Local Area Network (LAN), or a Wide Area Network (WAN).

The preferred embodiments of the invention are now described as to enable a person of ordinary skill in the art to make and use the same. Variations of the preferred embodiment are possible without being outside the scope of the present invention. Therefore, to particularly point out and distinctly claim the subject matter regarded as the invention, the following claims conclude the specification.

The invention claimed is:

1. A computer-implemented method comprising:
receiving a job description comprising a target soft-skill score;
generating an adjusted soft-skill score for a candidate by adjusting a baseline soft-skill score based on a feedback-related soft-skill score and a weight, wherein the baseline soft-skill score is based on a self-evaluation process completed by the candidate, and wherein the weight is based on a career selected by the candidate and corresponding to the job description;
storing the adjusted soft-skill score in a digital locker associated with the candidate;
synchronizing the digital locker to provide for migration between an online mode and an offline mode;
determining whether the adjusted soft-skill score meets the target soft-skill score;
based on determining that the adjusted soft-skill score meets the target soft-skill score, determining that the candidate is eligible for a virtual interview;
after determining that the candidate is eligible for the virtual interview, receiving the virtual interview associated with the candidate; and
storing the virtual interview in the digital locker.

2. The computer-implemented method of claim 1, further comprising:
evaluating the virtual interview; and
based on results of evaluating the virtual interview, transmitting, to the candidate, a message regarding the job description.

3. The computer-implemented method of claim 2, wherein evaluating the virtual interview comprises:
obtaining a plurality of virtual interviews that comprises the virtual interview;
determining an assessment criterion for the plurality of virtual interviews;
evaluating the plurality of virtual interviews based on the assessment criterion;
based on evaluating the plurality of virtual interviews, selecting one or more virtual interviews of the plurality of virtual interviews; and
generating a resume book comprising the one or more virtual interviews.

4. The computer-implemented method of claim 3, wherein the resume book lists, for each respective virtual interview of the one or more virtual interviews, a corresponding assessment of the respective virtual interview.

5. The computer-implemented method of claim 1, wherein the job description comprises a plurality of criteria corresponding to the job description, wherein the plurality of criteria comprises the target soft-skill score, wherein the adjusted soft-skill score is stored in the digital locker as part of a plurality of credentials associated with the candidate, and wherein determining whether the adjusted soft-skill score meets the target soft-skill score comprises:
determining whether the plurality of credentials associated with the candidate meets the plurality of criteria of the job description.

6. The computer-implemented method of claim 5, wherein the plurality of criteria of the job description comprises two or more of: a criterion related to work experience, a criterion related to technical expertise, a criterion related to soft skills, a criterion related to a grade point average, a criterion related to an academic major, or a criterion related to authorization to work.

7. The computer-implemented method of claim 1, further comprising:

providing the self-evaluation process for completion by the candidate; and
determining a baseline fundamental-soft-skill score for a fundamental soft skill based on the self-evaluation process completed by the candidate, wherein the baseline soft-skill score is based on the baseline fundamental-soft-skill score for the fundamental soft skill.

8. The computer-implemented method of claim 7, wherein the fundamental soft skill includes one or more of: a teamwork soft skill, a leadership soft skill, a communication soft skill, a commitment soft skill, or an attitude soft skill.

9. The computer-implemented method of claim 1, wherein the feedback-related soft-skill score is based on feedback received about the candidate, wherein the feedback comprises a feedback-related fundamental-soft-skill score for a fundamental soft skill.

10. The computer-implemented method of claim 1, wherein the adjusted soft-skill score forms part of a career profile of the candidate that is representative of a career history of the candidate.

11. The computer-implemented method of claim 1, wherein determining whether the candidate is eligible for the virtual interview comprises:
identifying a plurality of candidates, wherein each respective candidate of the plurality of candidates is associated with a corresponding adjusted soft-skill score that meets the target soft-skill score, and wherein the plurality of candidates comprises the candidate;
determining a short list of candidates based on the plurality of candidates; and
determining that the candidate is on the short list of candidates.

12. The computer-implemented method of claim 1, wherein receiving the virtual interview comprises:
sending an invitation for the virtual interview to the candidate;
determining one or more questions for the virtual interview; and
receiving a representation of the candidate performing the virtual interview based on the one or more questions.

13. The computer-implemented method of claim 1, further comprising:
selecting, from a plurality of entities, a particular entity for a position corresponding to the job description, wherein each entity of the plurality of entities is associated with a corresponding set of one or more candidates; and
transmitting the job description to the particular entity.

14. The computer-implemented method of claim 1, wherein the job description comprises one or more of: recruiting information, corporate information, industry information, day-in-the-life information, sample articles, reports, product descriptions, or location-specific information.

15. A system comprising:
a processor;
a non-transitory computer-readable storage medium having stored thereon instructions that, when executed by the processor, cause the processor to perform operations comprising:
receiving a job description comprising a target soft-skill score;
generating an adjusted soft-skill score for a candidate by adjusting a baseline soft-skill score based on a feedback-related soft-skill score and a weight, wherein the baseline soft-skill score is based on a self-evaluation process completed by the candidate, and wherein the weight is based on a career selected by the candidate and corresponding to the job description;

storing the adjusted soft-skill score in a digital locker associated with the candidate;

synchronizing the digital locker to provide for migration between an online mode and an offline mode;

determining whether the adjusted soft-skill score meets the target soft-skill score;

based on determining that the adjusted soft-skill score meets the target soft-skill score, determining that the candidate is eligible for a virtual interview;

after determining that the candidate is eligible for the virtual interview, receiving the virtual interview associated with the candidate; and storing the virtual interview in the digital locker.

16. The system of claim 15, further comprising:

evaluating the virtual interview; and based on results of evaluating the virtual interview, transmitting, to the candidate, a message regarding the job description.

17. The system of claim 15, wherein the job description comprises a plurality of criteria corresponding to the job description, wherein the plurality of criteria comprises the target soft-skill score, wherein the adjusted soft-skill score is stored in the digital locker as part of a plurality of credentials associated with the candidate, and wherein determining whether the adjusted soft-skill score meets the target soft-skill score comprises:

determining whether the plurality of credentials associated with the candidate meets the plurality of criteria of the job description.

18. The system of claim 15, wherein the operations further comprise:

providing the self-evaluation process for completion by the candidate; and determining a baseline fundamental-soft-skill score for a fundamental soft skill based on the self-evaluation process completed by the candidate, wherein the baseline soft-skill score is based on the baseline fundamental-soft-skill score for the fundamental soft skill.

19. The system of claim 15, wherein the feedback-related soft-skill score is based on feedback received about the candidate, wherein the feedback comprises a feedback-related fundamental-soft-skill score for a fundamental soft skill.

20. A non-transitory computer-readable storage medium having stored thereon instructions that, when executed by a computing device, cause the computing device to perform operations comprising:

receiving a job description comprising a target soft-skill score;

generating an adjusted soft-skill score for a candidate by adjusting a baseline soft-skill score based on a feedback-related soft-skill score and a weight, wherein the baseline soft-skill score is based on a self-evaluation process completed by the candidate, and wherein the weight is based on a career selected by the candidate and corresponding to the job description;

storing the adjusted soft-skill score in a digital locker associated with the candidate;

synchronizing the digital locker to provide for migration between an online mode and an offline mode;

determining whether the adjusted soft-skill score meets the target soft-skill score;

based on determining that the adjusted soft-skill score meets the target soft-skill score, determining that the candidate is eligible for a virtual interview;

after determining that the candidate is eligible for the virtual interview, receiving the virtual interview associated with the candidate; and storing the virtual interview in the digital locker.

* * * * *